(12) United States Patent
Wittenschlaeger

(10) Patent No.: US 11,850,955 B1
(45) Date of Patent: Dec. 26, 2023

(54) SYSTEMS AND METHODS FOR VEHICLE ENVIRONMENTAL IMPACT CANCELLATION

(71) Applicant: AYRO, Inc., Round Rock, TX (US)

(72) Inventor: Thomas M. Wittenschlaeger, Sarasota, FL (US)

(73) Assignee: AYRO, INC., Round Rock, TX (US)

( * ) Notice: Subject to any disclaimer, the term of this patent is extended or adjusted under 35 U.S.C. 154(b) by 0 days.

(21) Appl. No.: 18/186,707

(22) Filed: Mar. 20, 2023

Related U.S. Application Data

(63) Continuation of application No. 17/807,960, filed on Jun. 21, 2022, now Pat. No. 11,609,098.

(51) Int. Cl.
*B60L 50/60* (2019.01)

(52) U.S. Cl.
CPC .......... *B60L 50/60* (2019.02); *B60L 2200/00* (2013.01); *B60L 2240/423* (2013.01); *B60L 2240/70* (2013.01); *G05D 2201/0204* (2013.01); *G05D 2201/0208* (2013.01)

(58) Field of Classification Search
None
See application file for complete search history.

(56) References Cited

U.S. PATENT DOCUMENTS

| | | | |
|---|---|---|---|
| 4,984,616 A * | 1/1991 | Shepler | B60C 19/001 152/902 |
| 6,190,478 B1 * | 2/2001 | Watkins | B60C 19/001 152/903 |
| 2019/0248221 A1 * | 8/2019 | Serrano | B60K 5/1283 |
| 2020/0168382 A1 * | 5/2020 | Huebl | B60R 16/02 |
| 2021/0229506 A1 * | 7/2021 | France | B60C 23/003 |

* cited by examiner

*Primary Examiner* — Lail A Kleinman
(74) *Attorney, Agent, or Firm* — HAYNES AND BOONE, LLP

(57) ABSTRACT

A vehicle for traversing an area with a minimal environmental impact is described. The vehicle includes a first component that creates a first environmental impact when the vehicle is traversing in the area. The vehicle further includes a second component configured to reduce the first environmental impact.

20 Claims, 16 Drawing Sheets

Tire Tread Pattern 1102

Tire Tread Pattern 1104

Tire Track 1106

Residual Tire Track 1108

Residual Tire Track 1110

SYSTEMS AND METHODS FOR VEHICLE ENVIRONMENTAL IMPACT CANCELLATION

CROSS-REFERENCE TO RELATED APPLICATIONS

This application is a continuation of U.S. patent application Ser. No. 17/807,960, filed Jun. 21, 2022, the entire disclosure of which is incorporated herein by reference.

FIELD OF THE INVENTION

The field of the invention is technologies associated with vehicle environmental impact reduction and elimination, and in particular, cancellation of environmental impacts created by an electrical vehicle.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

With the dawn of widespread development and use of electric vehicles, there has also been diversification of specific markets for such vehicles from large cargo carrying trucks down to micro drones. One specific market area that has developed over the last several years includes the market for low-speed vehicles (LSVs), which typically include four-wheel electric vehicles having a top speed of about 25 to 35 miles per hour (about 40 to 56 kilometers per hour). LSVs have found many target use cases including last mile delivery, maintenance for campus, forestry, or other areas where there is no need for heavy or cumbersome traditional vehicles. However, even though LSVs are already environmentally sound (e.g., light weight, low to no fossil fuel emissions, low noise, etc.), they can still have significant negative environmental impacts. For example, a maintenance LSV might need to traverse a natural, unpaved area (e.g., a field, lawn, meadow, etc.). In such cases, the wheels of the vehicle still may rip up the natural terrain during acceleration, such as when power is engaged or when braking, which can damage the environment. Further, in areas where there are significant differences in terrain, possibly including slopes, pavement, lawn, etc., an operator of the LSV might engage power in a manner that is not environmentally sound for the local environment or in a manner that could even be dangerous given the local conditions.

Even though great strides have been made in electric vehicles, there remains a need to ensure electric vehicles have reduced impact on the environment in which they operate. Electric vehicles should ensure their operational parameters are constrained to protect the environment, while also being adjusted for local conditions, or managed to ensure safety of the operator or the vehicle itself. The following discussion describes the work of the inventor and gives rise to electric vehicles (e.g., LSVs, etc.) that are more ecologically sensitive while also retaining economical efficiencies or work-related performance.

SUMMARY

The inventive subject matter provides apparatus, systems, and methods in which an electric vehicle is dynamically configured to have reduced impact on a real-world environment (e.g., forest, golf course, farm, campus, etc.). One example embodiment includes an environmentally low impact electric vehicle, which can comprise a set of sensors, at least one battery, and a vehicular controller. One or more batteries, preferably rechargeable or swappable batteries, provide power to the electric vehicle's various electrical elements. The set of sensors are coupled with the vehicular controller and provide information about the local environment of the vehicle. The sensors may further provide information about the environmental impact the vehicle has been making. Further, the set of sensors can cover a broad range of sensor modalities and can include accelerometers, gyroscopes, piezoelectric sensors, cameras, LIDAR, radar, GPS, sound detectors, electromagnetic field sensors, or other types of sensors. The vehicular controller comprises a computer readable memory and at least one processor and is further coupled with the set of sensors and the batteries for power.

The vehicular controller may be configurable to control the electric vehicle (e.g., controlling environmental impact cancellation systems, controlling associated components of the vehicle, adjusting the operational profile, etc.) to minimize residual environmental impacts of the vehicle based on various environmental information (e.g., determined from sensor data obtained from the set of sensors, provided by an operator, etc.). Such environmental information may include various types of environmental impacts created by the vehicle, the geo-location of the vehicle, a locally sensed context, any other suitable environmental data, and/or a combination thereof. More specifically, when the processor executes software instructions stored in the memory, the controller performs various operations including obtaining environmental data, including obtaining environmental impact data from various environmental impact sensors (e.g., electromagnetic field sensors, sound/noise sensors, surface impact sensors, thermal sensors, cameras etc.) and obtaining location data from at least one location sensor (e.g., GPS, inertial measurement unit (IMU), visual location, etc.).

The controller's operations may further include receiving at least one operational profile, typically a torque profile, from a profile database where the operational profile is selected based on the environmental data. For example, the profile database could store operational profiles indexed based on geo-fences or geo-locations and can return such profiles in response to receiving a geo-location query. Additional operations include instantiating a local vehicle context in the memory based on local environment sensor data obtained from the sensors. Preferably, the local context provides a more fine-grained understanding of the environment around the vehicle. Thus, the operations can further include generating a set of operational instructions (e.g., wheel instructions, motor instructions, etc.) based on the operational profile and the local context. In more specific embodiments, a torque profile is adjusted based on the local context and corresponding instructions are generated for the motors driving the wheels of the vehicle. Once the set of operational instructions are generated, the operations can further include executing the instructions to thereby cause the vehicle to take corresponding actions; motors causing the wheels to move according to a torque profile, for example.

The goal is to design and produce zero emission, tailorable, low speed vehicles that serve a plurality of purposes, with a high level of sustainability in every phase of vehicle design and operation. Various techniques and designs are implemented to achieve a vehicle that traverses its chosen environment without disturbing it, damaging it, or leaving minimal residual traces of having been there. Specifically, zero emission allows for vehicle use indoors, in highly congested environments, or in any application where emissions may affect the health or productivity of living beings. In an example, the weight of the vehicle is minimized while maximizing the contact patch and unique tire compounding to leave the surfaces traversed undamaged. In another example, a controller controls the vehicle (e.g., throttle response, brake response, other suitable responses, and/or a combination thereof) to minimize impact to the environment (e.g., by eliminating wheel spinning and the associated turf or soft surface disruption). In yet another example, payload subsystems of the vehicle are extraordinarily lightweight and highly reconfigurable (e.g., switched from a flatbed to a pickup bed to a boxbed or any suitable variation), allowing for different uses (e.g., resort use during the day, utility use at night, or tailored food deliveries that differ between the breakfast, lunch, and dinner hours). In that example, the controller controls the vehicle according to the different payload subsystem configurations for minimizing impact to the traversed environment. In yet another example, to achieve a minimized surface impact, the controller controls the vehicle to use back tires to reduce or eliminate tire tracks of the front tires (e.g., where the back tires have tread patterns opposing the tread patterns of the front tires) based on the environmental data, including tire track data of the tire tracks created by the vehicle. In yet another example, to achieve a minimized electromagnetic environmental impact, the controller controls an electromagnetic impact cancellation system based on the environmental data, including electromagnetic environmental impact data of the electromagnetic environmental impact created by the vehicle. In yet another example, to achieve a minimized noise environmental impact, the controller controls a noise impact cancellation system based on the environmental data, including noise impact data of the noise impact created by the vehicle. In yet another example, to achieve a minimized thermal environmental impact, the controller controls a thermal impact cancellation system (e.g., with thermal management of external surfaces of the vehicle) based on the environmental data, including thermal impact data of the thermal impact created by the vehicle. In yet another example, to achieve a minimized visual environmental impact, the controller controls a visual cancellation system (e.g., with visual management of external surfaces of the vehicle to reflect or mirror the environment) based on the environmental data.

Embodiments of the invention are described by the claims that follow the description. Consistent with some embodiments, a vehicle for traversing an area with a minimal environmental impact includes a first component that creates a first environmental impact when the vehicle is traversing in the area. The vehicle further includes a second component configured to reduce the first environmental impact. Consistent with other embodiments, a method for traversing an area with a minimal environmental impact includes providing a first component of a vehicle, and providing a second component of the vehicle configured to reduce a first environmental impact created by the first component.

Various objects, features, aspects, and advantages of the inventive subject matter will become more apparent from the following detailed description of preferred embodiments, along with the accompanying drawing figures in which like numerals represent like components.

DETAILED DESCRIPTION

Figure 1:
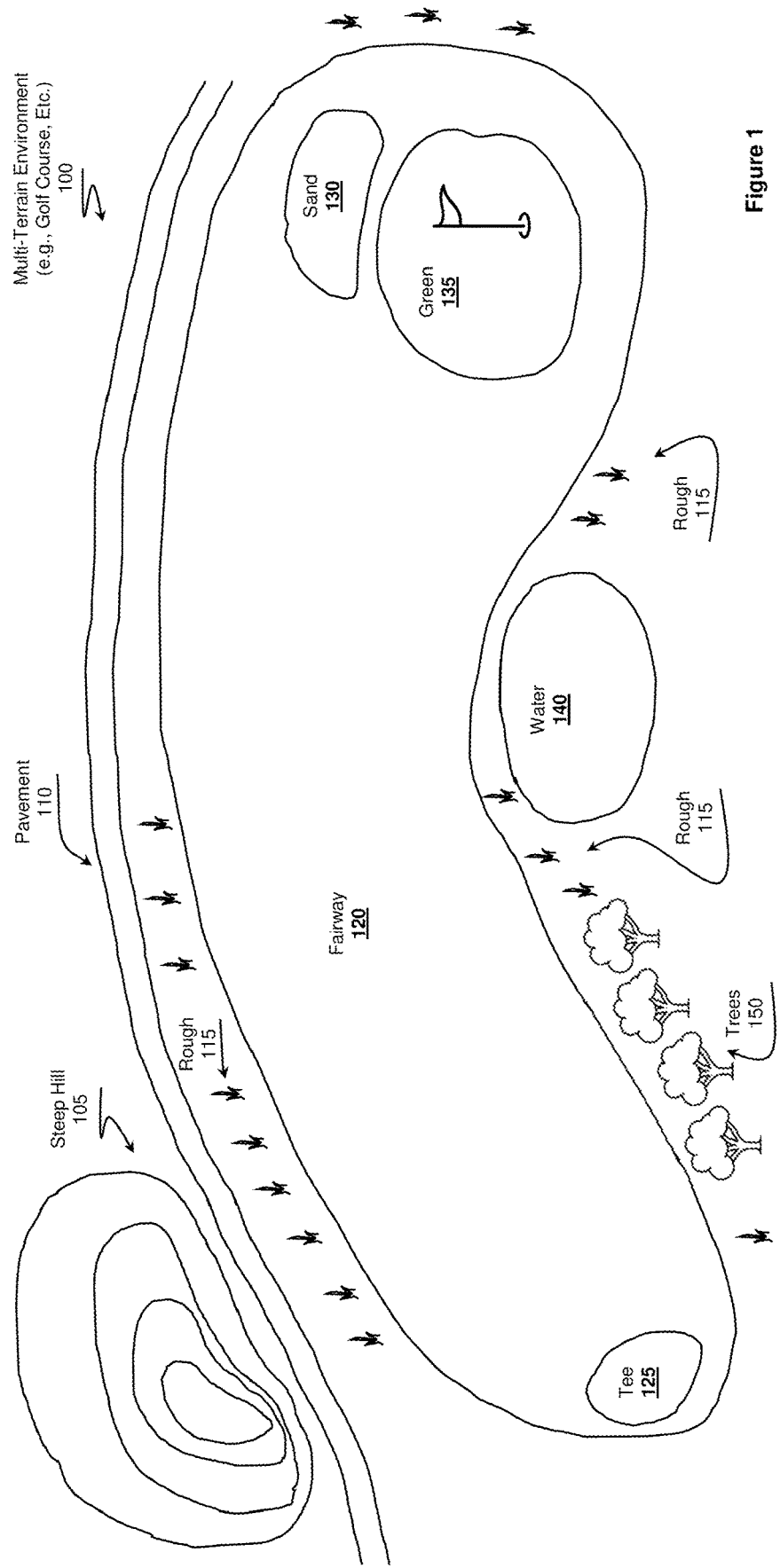
FIG. 1 provides a schematic of an example environment with different types of terrain according to some embodiments.

It should be noted that any language directed to a computer or computing device (e.g., a controller, etc.) should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium or memory (e.g., hard drive, field-programmable gate array (FPGA), programmable logic array (PLA), solid state drive (SSD), random-access memory (RAM), flash, read-only memory (ROM), etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on Hypertext Transfer Protocol (HTTP), Hypertext Transfer Protocol Secure (HTTPS), Advanced Encryption Standard (AES), public-private key exchanges, web service application programming interfaces (APIs), known financial transaction protocols, or other electronic information exchanging methods. Data exchanges among devices can be conducted over a packet-switched network, the Internet, local area network (LAN), wide area network (WAN), virtual private network (VPN), or other type of packet switched network; a circuit switched network; cell switched network; or other type of network.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

The inventive subject matter provides apparatus, systems, and methods in which an electric vehicle is dynamically configured to have reduced impact on a real-world environment (e.g., forest, golf course, farm, campus, etc.). One example embodiment includes an environmentally low impact electric vehicle, which can comprise a set of sensors, at least one battery, and a vehicular controller. One or more batteries, preferably rechargeable or swappable batteries, provide power to the electric vehicle's various electrical elements. The set of sensors are coupled with the vehicular controller and provide information about the local environment of the vehicle. Further, the set of sensors can cover a broad range of sensor modalities and can include accelerometers, gyroscopes, piezoelectric sensors, cameras, LIDAR, radar, GPS, sound detectors, electromagnetic field sensors, or other types of sensors. The vehicular controller comprises a computer readable memory and at least one processor and is further coupled with the set of sensors and the batteries for power. The vehicular controller is configurable to adjust the operational profile of the electric vehicle based on the geo-location of the vehicle as well as based on a locally sensed context determined from sensor data obtained from the set of sensors. More specifically, when the processor executes software instructions stored in the memory, the controller performs various operations including obtaining location data from at least one location sensor (e.g., GPS, inertial measurement unit (IMU), visual location, etc.). The controller's operations further include receiving at least one operational profile, typically a torque profile, from a profile database where the operational profile is selected based on the location data. For example, the profile database could store operational profiles indexed based on geo-fences or geo-locations and can return such profiles in response to receiving a geo-location query. Additional operations include instantiating a local vehicle context in the memory based on local environment sensor data obtained from the sensors. Preferably, the local context provides a more fine-grained understanding of the environment around the vehicle. Thus, the operations can further include generating a set of operational instructions (e.g., wheel instructions, motor instructions, etc.) based on the operational profile and the local context. In more specific embodiments, a torque profile is adjusted based on the local context and corresponding instructions are generated for the motors driving the wheels of the vehicle. Once the set of operational instructions are generated, the operations can further include executing the instructions to thereby cause the vehicle to take corresponding actions; motors causing the wheels to move according to a torque profile, for example.

The goal is to design and produce zero emission, tailorable, low speed vehicles with minimal environmental impacts that serve a plurality of purposes. Various techniques and designs are implemented to achieve a vehicle that traverses its chosen environment without disturbing it, damaging it, or leaving any residual traces of having been there. Specifically, zero emission allows for vehicle use indoors, in highly congested environments, or in any application where emissions may affect the health or productivity of living beings. In an example, the weight of the vehicle is minimized while maximizing the contact patch and unique tire compounding to leave the surfaces traversed undamaged. In another example, a controller (e.g., using a processor and software) controls the vehicle (e.g., throttle response, brake response, other suitable responses, and/or a combination thereof) to minimize impact to the environment (e.g., by eliminating wheel spinning and the associated turf or soft surface disruption). In yet another example, payload subsystems of the vehicle are extraordinarily lightweight and highly reconfigurable (e.g., switched from a flatbed to a pickup bed to a boxbed or any suitable variation), allowing for different uses (e.g., resort use during the day, utility use at night, or tailored food deliveries that differ between the breakfast, lunch, and dinner hours). In that example, the controller may control the vehicle according to the different payload subsystem configurations for minimizing impact to the traversed environment.

As discussed in detail below, the disclosed techniques provide various advantageous technical effects for controlling the vehicle (e.g., dynamically adjusting the operational parameters of the vehicle, rotationally synchronizing the front and back wheels, etc.) to achieve a reduced impact on the environment while ensuring that the vehicle remains safe. An example advantage is controlling the vehicle based on various environmental data (e.g., environmental impacts created by the vehicle, its geolocation, its local environment, any other suitable environmental data, and/or a combination thereof) and vehicle configuration (e.g., payload configuration, tire patterns, etc.). Another example advantage is controlling a vehicle based on, a residual environmental impact created by the vehicle, e.g., after the controller performs environmental impact cancellation. Yet another example advantage is controlling a vehicle based on differences between residual environmental impacts resulted from different methods of environmental impact cancellation are performed.

In various embodiments, a vehicle can collect sensor data to determine environment data (e.g., environmental impacts created by the vehicle, nature of the local environment) around or near the vehicle. Various types of environmental impacts by the vehicle or components thereof may be determined, including for example, electromagnetic radiation impact (also referred to electromagnetic impacts), sound impacts (e.g., created by engine, horn, tire, etc.), emission impacts, surface impacts, thermal impacts, visual impacts, any other impact to the environment, and/or a combination thereof. The vehicle may collect such sensor data for each of the various types of environmental impacts created by the vehicle or components thereof, residual environmental impacts after the controller performs environmental impact cancellation, and combined environmental impacts as a whole. Furthermore, based on such data collected at different times, the effectiveness of environmental impact cancellation by the controller is determined (e.g., based on the differences of the environmental impacts before and after environmental impact cancellation), which enables the controller to adjust its environmental impact cancellation process to further reduce the residual environmental impacts.

The focus of the disclosed inventive subject matter is to enable construction or configuration of a computing device to operate on vast quantities of digital data, beyond the capabilities of a human. Although the digital data represents a local environment, it should be appreciated that the digital data is a representation of one or more digital models of the environment, not the natural environment itself. By instantiation of such digital models (e.g., a local vehicle context) in the memory of the computing devices (e.g., vehicular controller), the computing devices can manage the digital data or models in a manner that could provide utility to a user of the computing device that the user would lack without such a tool. Further, the disclosed vehicles can make fine-grained adjustments to their operational parameters based on local conditions far faster than a human could.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

FIG. 1 presents multi-terrain environment 100 in the context of a golf course as a framework to describe the inventive subject matter. While FIG. 1 illustrates environment 100 as a golf course, one should appreciate the disclosed techniques are not so limited. Rather environment 100 could comprise any real-world or physical environment having a spectrum of terrain types. For example, other environments could include college campuses, apartment complexes, amusement parks, military bases, cities, city parks, natural parks, retirement communities, or other types of environments. Regardless, the disclosed electric LSV can be considered to operate in multi-terrain environment 100 in various capacities including operating as one or more of a maintenance vehicle, a refrigeration vehicle, a grounds keeping vehicle, a cargo carrying vehicle, a delivery vehicle, a pleasure vehicle, a personal transport vehicle, a bus, an emergency vehicle, an unmanned vehicle or drone, an autonomous vehicle, a robot, or operate according to other types of service requirements.

The LSV may encounter various types of terrain which can impact the operation of the vehicle. Further, in view of the differences of the terrains, the vehicle can cause a negative impact on the environment. Consider a scenario where the LSV must contend with the terrains in environment 100 and must adjust its operational parameters as the LSV moves in a single terrain or moves from one terrain to another as discussed below.

From a high-level perspective, the disclosed LSVs can adjust their operational parameters using operational profiles stored in a database where the profiles are indexed by relevant location data. The LSV, via a vehicular controller, can obtain the profile via submitting a location-based query to the database. Further the LSV can use sensor data from one or more sensors disposed on or about the vehicle to determine a local context. The controller uses the local context to make fine-grained adjustments to the operational profile (e.g., a torque profile as discussed below, etc.) to ensure the LSV has a further optimized performance relative to the impact on the environment. Again, the details of these high-level features will be discussed further below.

Returning to environment 100, consider a scenario where the LSV is operating in a golf course setting, possibly as a grounds-keeping vehicle. A golf course setting was selected for this illustrative example due to the varied terrain and sensitivity of the terrain to repeated use while juxtaposed against the need to keep the terrain in a playable or pleasing state. However, as referenced above, the disclosed issues associated with a golf course can be extrapolated to other settings.

Environment 100 may include one or more hills or other physical features as exemplified by steep hill 105. Hill 105 may have one or more specific features that could impact the operation of the LSV. For example, hill 105 might simply be inaccessible according to an operational profile, thus the vehicle may be restricted or forbidden to operate on hill 105 or forbidden to approach a buffer area around hill 105. Such restrictions may be of use in cases where the vehicle or passengers may be at risk or to protect the natural environment (e.g., flora, fauna, prevent erosion, etc.), possibly in a nature park or nature reserve. Still, hill 105 could also remain accessible, although it might have specific features that must be accounted for; possibly including a steep slope as illustrated by the dense contours of hill 105. In such cases, the operational profile associated with the hill 105 can include commands that ensure the LSV can maintain stability on the slope, or other specific feature, or that also ensure the LSV doesn't damage the slope. More specifically, the LSV could be instructed to adjust tire pressure or torque so the wheels of the LSV roll without slipping or could be instructed to restrict movement along specific or defined paths on the slope wherein the paths are known to have the best approach for going up the slope or down the slope. Even further, the operational profiles associated with hill 105 can further include speed or velocity (i.e., speed and direction) restrictions on or around hill 105. One should appreciate that the operational profiles offer multiple advantages including one or more of the following: reduced impact on the environment, increased safety to passengers (e.g., tighten seat belt, reduce tilt, etc.), reduce risk to the vehicle itself and thereby increase cost savings (e.g., reduced maintenance, reduced replacements, reduced insurance costs, etc.), or increased management oversight.

While hill 105 might have operational profiles that result in reduced impact on the terrain in and around hill 105, pavement 110 might have operational profiles that are less restrictive. Pavement 110 can be considered a man-made terrain, for example, that is specifically configured to permit LSV to traverse an area with ease or without significantly impacting the environment. In the example shown, pavement 110 could include a cart path, but also could include a sidewalk, a street, a tennis court, or other type of prepared surface. For the sake of discussion, the operational profile associated with pavement 110 might be configured to permit LSV to operate as its full operational potential and may therefore not include restrictions. However, it is also possible the operational profile could restrict speeds to acceptable speed limits if desired. In a practical sense, while operating under the operational profile of pavement 110, the LSV could apply full torque from one or more motors to the wheels of the LSV or could achieve highest practical speeds, typically in the 25 mph to 35 mph range for most target use cases. While the disclosed vehicles are LSVs, it should be appreciated that other electric vehicles might not have such restrictions and might be permitted to operate in a higher capacity possibly limited only by their designs (e.g., road legal electric vehicles, electric trucks, drones, autonomous vehicles, boats, etc.).

While pavement 110 is considered paved, other types of vehicle corridors could also be present in environment 100, possibly including dirt roads, gravel roads, trails, or other types of prepared terrains. In such cases, the operational profiles for such prepared corridors can be adjusted accordingly to account for the differences in features. For example, a dirt road or gravel road might have operational profiles similar to pavement 110 but might restrict the torque applied to wheels to prevent rolling with slipping to reduce an amount of dust kicked up or to otherwise reduce the risk of disturbing environment 100. However, once rolling is achieved, the top speeds might not be restricted to permit the LSV to proceed to its destination in a timely fashion. Thus, operational profiles might be required to balance the need for operational goals relative to the desired to have reduced impact on environment 100.

Rough 115 represents yet another type of terrain that may be accounted for when creating operational profiles. While the rough of a golf course might simply include tall grass, it is possible rough 115 might have other attributes that influence corresponding operational profiles. More specifically, rough 115 could include flora or fauna that should be protected while also permitting the LSV to pass through. This gives rise to an interesting feature of the disclosed subject matter where multiple LSVs must be managed in aggregate rather than merely individually. For example, the operational profiles of rough 115 might permit a first LSV to pass through rough 115 along a specified path per unit time (e.g., per hour, per day, per week, per month, etc.), while a second LSV would be restricted from following the same path but would be permitted to traverse rough 115 along a second, different path. Such approaches are advantageous because the LSV retains access to the terrain, but also the terrain is permitted to recover after use. Thus, the operational profiles can be constructed to account for wear-leveling a terrain.

Turning toward fairway 120, fairway 120 can also have yet another set of operational profiles that differ from the other terrains. Fairway 120 is presented as an example of a "natural" (e.g., lawn, grass, etc.) terrain that may be prepared for use, but still should be protected to some degree. In some scenarios, the operational profiles of fairway 120 could also account for wear-leveling. In addition, the operational profiles might include restrictions based on max speed to reduce chances of collisions with other vehicles, people, or wildlife sharing the terrain. Still further, the operational profiles might also include proximity restrictions to simply forbid LSVs from sharing the same physical space, subject to buffer zones as desired. Rolling without slipping via torque control may also be an important feature of the operational profiles for fairway 120 to reduce the risk of the wheels of the LSV ripping the turf.

Tee 125 is presented as an example area that maybe small or possibly have a relatively high density of people present. In such examples, the corresponding operational profiles may have many of the various features already discussed, but might have further adjustments to account for features of the area. For example, in view the area might have a high density of people, the operational profile might limit the max speed to ensure the operators have time to react to the people present. Further, the number of vehicles permitted in the area might be restricted. Consider a scenario where the LSV is operating as a golf cart. The operational profiles for tee 125 could restrict the max speed to 2 mph, for example, and only allow two carts on the tee at the same time to account for a single party of golfers to be present on the tee at a time. In view of tee 125 can be considered a small area, restricting the max speed does not necessarily impact the utility of the vehicle in the area as an operator can traverse the area quickly. Further restricting the number of LSVs in the area can also be considered wear leveling.

Sand 130, illustrated as a sand trap, represents yet another type of terrain having interesting features that can be accounted for. Sand 130 could be similar in nature to the dirt or gravel roads mentioned above where the material of the terrain is loose, which may require the operational profiles to ensure the LSV moves by rolling without slipping as governed by a corresponding torque profile. Beyond controlling the wheel movements relative to the terrain, the operational profile could also include instructions to adjust other features of the LSV. For example, in some embodiments, the operational profile could also adjust the tire pressure of the LSV. As the LSV enters the area of sand 130, the LSV could reduce the tire pressure of the LSV's tires so that the tires have better traction while also operating under a rolling without slipping torque profile. In addition to or alternatively, as the LSV leaves the area of sand 130, the tire pressure could be increased to ensure the LSV, assuming the LSV is provisioned with self-inflating tires and/or corresponding pumps, operates with improved efficiency on the new terrain (e.g., fairway 120, pavement 110, etc.). Thus, one should appreciate the operational profiles can comprise features beyond controlling the motors or motion of the wheels of the LSV and can include operational parameters in or about the LSV.

In various embodiments, adjusting operational parameters including tire pressure also gives rise to purpose-built equipment that can be quite complementary to the disclosed inventive subject matter. To continue with the tire pressure example, altering the tire pressure to suite the environment can also impact the features of the tire itself beyond just the pressure itself. For example, changing the pressure could also change the shape of the tire to suit the environment. With respect to low pressure, tires such as System 3 Off-Road 32×12-15 System 3 Offroad SS360 Sand/Snow Bias Rear Tire would have better performance in snow or sand when the pressure is lower by adapting such tires to change shape or to increase the number of treads or paddles capable of engaging the loose contact surface. From a high-pressure perspective, tires such as Proline 1014613 Sling Shot MX43 Pro-Loc Tires could have fins or wings that expand out as pressure is increased. At even higher pressures, tires can be constructed so that studs (e.g., metal, rubber, etc.) or other features can emerge from between the treads when the pressure increase beyond a threshold. Thus, the pressure activated studded tires for the LSV would provide further traction, possibly on slippery, wet, snowy, or icy surfaces.

An example of such a tire that could be suitably adapted for such a purpose includes the CST Sandblast Rear Tire 32×12-15 (15 Paddle) for Polaris RANGER RZR XP TURBO S 2018. Thus, the inventive subject matter is considered to include adapting tires, or other elements of the LSV, to be responsive or complementary to adjusting the operational parameters of the LSV due to the local environment.

While sand 130 may also have operational profiles similar to those discussed above including area restrictions or limitations, rolling without slipping instructions, speed restrictions, or other features, the nature of sand 130 could vary dramatically based on local or temporal conditions. For example, sand 130 might be dry, which may require speed or torque control as discussed above to reduce rolling without slipping. However, sand 130 may also be wet, possibly after maintenance or rain. In which case, the sand 130 may behave more like pavement 110 with respect to the performance of the LSV. The varied nature of the terrain under various local or temporal conditions give rise to the need for more fine-grained control as discussed further below.

Green 135 could be considered similar to fairway 120 or tee 125. However, green 135 represents an area that requires a high degree of care or expense to keep the area in a pristine state. Thus, green 135 could comprise operational profiles that simply exclude LSVs from entering the area. However, green 135 might also include operational profiles that function based on the nature of the LSV. Said differently, the attributes of the LSV may be used to determine which operational profile should be used in conjunction with the area. For example, if the LSV is a golf cart, the operational profile may simply exclude the LSV from entering the area. However, if the LSV is a grounds-keeping vehicle, the LSV may be permitted to enter the area with reduce tire pressure to increase the contact surface area of the wheels to thereby reduce the pressure of the vehicle on the terrain and reduce the impressions made in the terrain. In some embodiments, the LSV could be a lawn mower used to maintain the area.

Water 140, similar to sand 130, is illustrated as a hazard. In the golf course context, a LSV would be restricted from approaching water 140 to closely. However, it is also contemplated that other types of vehicles (e.g., drones, autonomous vehicles, lawn mowers, boats, etc.) might be permitted to approach the area in and around water 140. Additionally, water 140 also provides an illustrative example of an area having features not yet discussed. More specifically, the area around water 140 could comprise a flood plain, which may become critical during or after rain. For example, during or after rain the features around water 140 or other terrains around environment 100, might change due to flooding; for example, overflowing creeks and bridges could become impassible, or experience other changes. In which case, the LSV could alter the restriction requirement of the operational profiles to further restrict the LSV from entering the area. Alternatively, if water 140 could be covered in ice, in which case water 140 could have a corresponding operational profile permitting the LSV to operate on the ice. If emergency conditions exist, the operational profiles could include instructions the define permitted paths to safety. Still further, water 140 could have other conditions that could be important to one or more vehicles. Other local conditions could include waves, choppiness, water depths, or other conditions. Examples of water 140 could include a pond, water hazard, lake, ocean, beach, river, creek, stream, pool, or other type of body of water.

Trees 150 are also presented as an additional terrain having interesting features. Trees 150 represents an area that may be passible by LSV, but could have tight spaces which could cause maneuvering to be difficult. In such cases, the operational profile for the terrain of trees 150 to restrict the speed of LSV to reduce risk of impact with one or more trees. Further, having reduced speed, possibly rolling without slipping, will have a reduced impact of the natural environment around the trees. Additionally, in view the spaces where LSV may operate safely are difficult to find, the corresponding operational profiles can include one or more pre-programmed path that permit the operator to navigate the environment. Additional examples of restrictions that could apply in and around trees 150 include restricting turn radius, preventing the LSV from going in reverse, permit only service vehicles, permit only authorized operators in the area, or other features.

While environment 100 is mainly shown as a static environment, one should appreciate environment 100 could be quite dynamic as alluded to above. Thus, the shapes or features of environment 100 could change with time, weather conditions, natural events, man-made events, or other factors. Consider a case where the weather changes from clear to rainy. Pavement 110 might exhibit a significant change in friction, shift from a from dry, high friction terrain to a wet, low friction terrain. Thus, the corresponding operational profile might need updated. Alternatively, more than one operational profile could be obtained from which the LSV selects the most appropriate.

Figure 2:
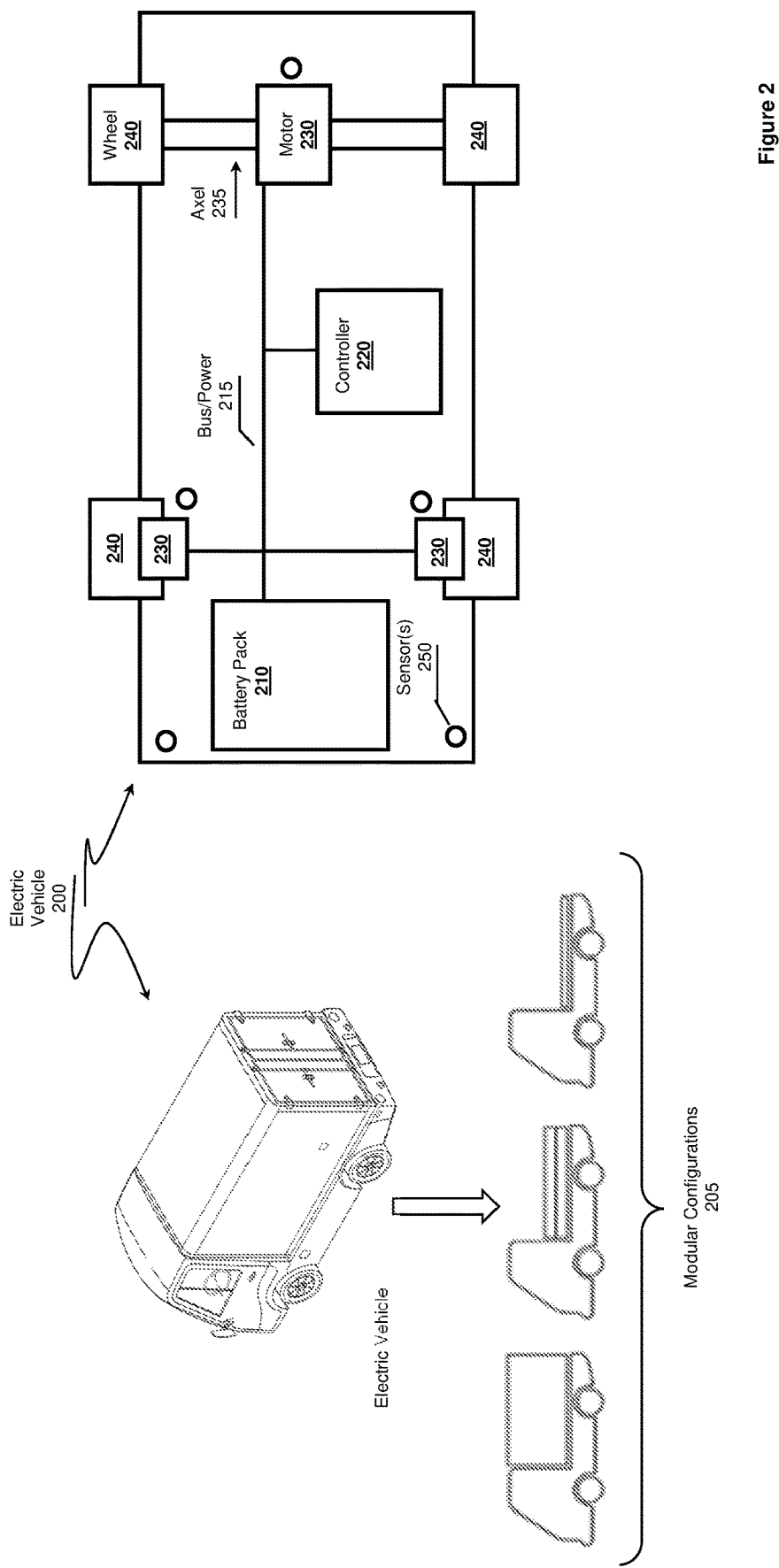
FIG. 2 illustrates an example electric vehicle according to some embodiments.

Environment 100 is illustrated as a single hole of a golf course. Still, one should appreciate the target working environment of an LSV could vary in size, dimensions, elevation, or other factors. For example, environment 100 could be defined based on political boundaries (e.g., zip codes, cities, etc.), geo-fenced boundaries, S2 cells, or other types of boundaries where the encompassed area could include a single type of terrain to many types of terrains (e.g., 2, 5, 10, 100, or more terrains). Of particular note, environment 100 could comprise a larger number of neighboring terrains similar to the terrains in environment 100. In such cases, the operational profiles can include rules or instructions by which the LSV should shift from deployment of one operational profile to another. Such transition rules can be considered to form an impedance match between terrains, which could include deceleration instructions, tire pressure changes, or other types of shifts in the operational profiles.

Where FIG. 1 presents a high-level overview of a potential operating environment for and LSV, FIG. 2 provides a more detailed discussion of an LSV. LSV 200 represents an acceptable electric low speed vehicle embodiment for use with the disclosure inventive subject matter. Example acceptable LSV 200 includes the Ayro, Inc. Club Car Current (see URL www.ayro.com/club-car-current), which is currently on the market at the time of this writing. LSV 200 is illustrated as a four-wheel vehicle. However, any practical number of wheels is also contemplated; two wheels (e.g., cycle configuration), three wheels (e.g., trike, etc.), and so on.

LSV 200 comprises one or more module configuration 205 permitting LSV 200 to change its target purpose. Module configurations 205 can be considered to change the nature of LSV 200, which in turn can change which operational profiles are of most relevance, possibly based on the attributes of LSV 200. For example, in a flatbed configuration LSV 200 could be operating as a grounds keeping vehicle. In which case, LSV 200 may be permitted to operate in natural terrains; lawns, fairways, forest, or other natural terrains for example. However, in a cargo configuration, LSV 200 could be operating in a delivery capacity. In which case, the corresponding operational profiles may permit LSV 200 to operate at higher speeds, but only on paved surfaces.

In more preferred embodiments LSV 200 operates as a battery-powered electric vehicle. LSV 200 comprises at least one battery as represented by battery pack 210. Battery pack 210 can comprise one or more rechargeable battery (e.g., Li-ion, Li-polymer, Li—S, etc.). Further, in some embodiments, battery pack 210 could comprise one or more swappable batteries to facilitate getting LSV 200 back in operation after a battery has drained. LSV further comprises a set of sensors 250 as represented by the small circles in FIG. 2. While sensors 250 are illustrated disposed on or about LSV 200, the inventive subject matter is not so restricted. Rather, sensor 250 could be deployed remotely. Further sensor data could be obtained from any local or remote source (e.g., weather prediction, news events, etc.). Especially preferred sensors include at least one location sensor; a GPS unit for example. Still other types of location sensors could comprise image-based sensor, IMUs, wireless triangulation units, cellular network location units, or other types of location sensors. LSV 200 further includes a set of controllable wheels 240 that are mechanically coupled with at least one controllable motor 230, which in turn is electrically coupled with battery pack 210.

LSV 200 presents various configurations of wheels 240 and motors 230 for discussion purposes. In some embodiments, each of wheel 240 could have a dedicated motor 230 in a manner that permits each wheel 240 to operate individually, but also collectively under instructions of vehicular controller 220. Still, in other embodiments, a single motor 230 could couple to more than one wheel 240. For example, a single motor 230 could couple to an axel of LSV supporting two or more wheels where motor 230 cause wheels 240 to rotate via a drive train. Thus, it should be appreciated that wheels 240 rotate in response to engagement of one or more of motors 230. LSV 200 further comprises one or more vehicular controller 220, which provides instructions to motors 230 or wheels 240 as well as governs other operational parameters of LSV 200.

Figure 3:
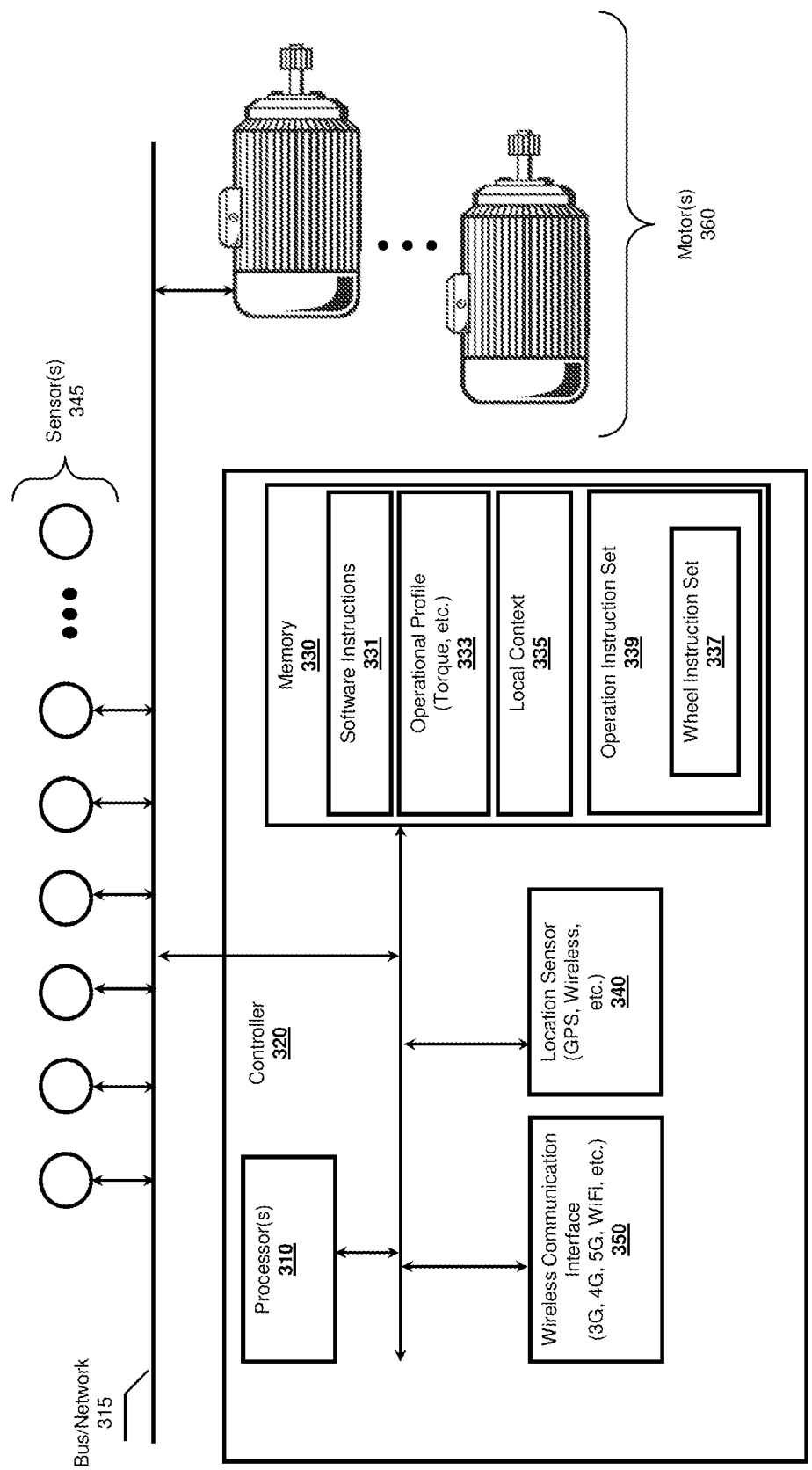
FIG. 3 illustrates an example computer-based controller for an electric vehicle according to some embodiments.

FIG. 3 provides additional information regarding a vehicular controller of contemplated LSVs. Controller 320 comprises a computing device having at least one computer readable memory 330 (e.g., RAM, ROM, flash, SSD, hard disk drive (HDD), etc.) storing software instructions 331 that configure the controller to take the actions described herein. Controller 320 further comprises one or more of processor 310 that execute the software instructions 331. In some embodiments, controller 320 could comprise one or more off the shelf single board computers (e.g., Raspberry Pi, Arduino, PC-104, etc.) or a dedicated computing device. Controller 320 further communicatively couples to a set of sensors 345, which may be disposed about the LSV. For example, sensors 345 could be coupled with controller 320 via one or more buses or network 315 (e.g., Universal Serial Bus (USB), wireless USB (WUSB), BlueTooth, controller area network (CAN), LAN, WiFi, etc.). Further, controller 320 can couple with one or more of motors 360, which in turn couple with the wheels of the LSV. As controller 320 executes its actions it can instruct or control motors to take corresponding actions (e.g., increase torque, turn on, turn off, decrease torque, forward, reverse, etc.). While motors 360 are illustrated as coupling with vehicular controller 320 over bus/network 315, motors 360 could couple to controller 320 over a separate connection or could couple via individual connections. For example, motors 360 could couple directly to controller 320 via connectors (e.g., pulse-width modulation (PWM), etc.) while power is supplied from the battery of the LSV.

Sensors 345 represent a broad spectrum of sensors capable of providing sensor data to controller 320 where the sensor data reflects the local conditions of the LSV or related to the LSV. Example sensors include, but are not necessarily limited to, one or more of the following sensors: an accelerometer, a magnetometer, a piezoelectric sensor, a microphone, a camera, a fluid sensor, an optic sensor, a hall effect sensor, a capacitance sensor, a resistivity sensor, a proximity sensor, a radio detection and ranging (RADAR) sensor, a light detection and ranging (LIDAR) sensor, turning or turning radius sensor, tilt sensor, or other type of sensor. Although the plurality of sensors 345 are illustrates, in general, as being disposed on, in, or about the LSV, in some embodiments, one or more of sensors 345 could be a remote sensor or a remote source of sensor data. For example, a remote source of sensor data could comprise a web service that provides weather information or weather predictions. Further, sensors could be active or passive. Active sensors can continuously provide sensor input to controller 320 while a passive sensor might only provide input to controller upon request.

As can be appreciated from the broad spectrum of possible sensors 345, the corresponding sensor data can cover a broad spectrum of data modalities. Said in a different way, the sensor data can represent a wide variety of local conditions. Controller 320 can compile the sensor data, which may be a direct measure of the local environment (e.g., a temperature, a pressure, etc.) or may be an indirect measure of the local environment (e.g., a resistance, a capacitance, etc.), into local environment data reflecting the local conditions in which the LSV is currently operating or might be operating in the near future as it moves about the environment or as time changes. Example types of local environmental data can include, but is not limited to, weather data, precipitation data, friction data, temperature data, time data, audio data, image data, pressure data, tilt data, weight data, acceleration data, video data, image data, or other type of data about the environment.

Location sensor 340 is explicitly called out as it has a special purpose with respect to the disclosed subject matter. Location sensor 340 provides controller 320 location data associated with the LSV. Typically, the location data comprises a current location of the LSV in the operating environment. However, it some embodiments, controller 320 can calculate a possible future location of the LSV by deriving one or more predicted values based on the movement, speed, direction, or other movement attributes of the LSV. More preferred location sensors 340 can include a Global Positioning System (GPS) unit. However, other types of sensors can also be leveraged to determine a location of the LSV in the environment. For example, the LSV could use image data or video data to determine its location via one or more implementations of image processing algorithms (e.g., simultaneous localization and mapping (SLAM), visual SLAM (vSLAM), neural networks, etc.) or recognition algorithms (e.g., QR codes, bar codes, markers, optical character recognition (OCR), etc.) where the environment has been provisioned with recognizable markers. Still further, the LSV could leverage wireless triangulation to determine its location based on one or more wireless transmitters (e.g., cell towers, beacons, etc.).

While location sensor is illustrated as being deployed on controller 320 or on LSV, in some embodiments location sensor 340 could be remote as well. In such cases, the location data from location sensor 340 could be obtained by controller 320 over a network possibly via wireless communication interface 350. More specifically, an environment could leverage locally deployed cameras (e.g., security cameras, etc.), which can provide a video feed to a central server, which reports on an observed location of the LSV.

The location data associated with the LSV could take on different forms. In some embodiments, the location data could comprise a local coordinate within the operating environment, possibly an address or a specific local coordinate for the environment's custom coordinate system. Still in other embodiments, the location data could comprise a geo-location representing a wide area location relative to a broader location beyond just the local environment or represent a world-wide geo-location (e.g., longitude, latitude, S2 cell identifier, etc.). Thus, the geo-location could comprise a GPS coordinate or other form of global position coordinate. Regardless, controller 320 leverages the location data to obtain one or more operational profiles for the LSV.

Memory 330 stores one or more sets of software instructions 331, which could take on different forms as well. Software instructions 331 could comprise executable binary code, which is compiled from a high-level language (e.g., C, C++, C #, etc.) and downloaded to memory 330, possibly via wireless communication interface 350. Further, software instructions 331 could also be implemented as a script or program from an interpreted language (e.g., python, Java, perl, etc.). In more preferred embodiments software instructions can be replaced, upgraded, modified or otherwise changed in the field via wireless communication interface 350 once suitable permission or security measures are in place.

Beyond software instructions 331, memory 330 can also store other data structures or assets of use by controller 320. More specifically, memory 330 can store one or more of operational profile 333 retrieved from an operational profile database. For example, as the LSV travels around the environment, controller 320 can query the operational profile database using the location data obtained from location sensor 340. In response, controller 320 receives one or more corresponding operational profiles 333 relevant for the location. In response, controller 320 instantiates operational profile 333 in memory 330. As the LSV continues to operate in the environment, controller 320 enforces the rules, criteria, conditions, requirements, or other features of operational profile 333. Especially preferred operational profiles comprise a torque profile that governs the behaviors of motors 360 and thereby the contact surfaces of the LSV (e.g., wheels, etc.), which will be discussed in more detail with respect to FIG. 5.

Memory 330 also stores one or more of an instantiated local vehicle context 335. Context 335 represents the local conditions immediately around the LSV, which could be used by controller 320 to adjust the how the LSV operates according to the operational profile 333. Local context 335 comprises information compiled from the environmental data obtained or derived from the sensor data. Local context 335 does not necessarily need to include the actual environmental data, it could include the environmental data for bookkeeping reasons. Still, local context 335 leverages the environmental conditions to determine the fine-grained adjustments to make to operational profile 333.

In some embodiments, local context 335 can be manifested from information stored in operational profile 333. For example, operational profile 333 can include a set of permitted adjustments and corresponding local condition criteria according to which such adjustments are triggered. A permitted adjustment could be represented digitally according to one or more digital formats possibly including Extensible Markup Language (XML), YMAL, JavaScript Object Notation (JSON), binary, script, table, or another digital format. As local conditions are sensed, the corresponding digital representation of the local context 335 can be updated. Additional details of local context 335 will be discussed with respect to FIG. 7.

Memory 330 further stores wheel instruction set 337, which comprises a set of wheel instructions on how to control the contact surfaces of the LSV via one or more of motors 360. Depending on the nature of the implementation, instructions 337 could comprise high level APIs through which controller 320 generates desired actions or could include low level instructions (e.g., setting values of registers that impact a PWM, etc.) causing motors 360 to take corresponding actions and, again, affecting the contact surfaces (e.g., tires, etc.) of the LSV.

One should appreciate the above discussion refers to the wheels of the LSV, while other forms of contact surfaces or modes of motion are also contemplated. The term "wheel" is used for the sake of discussion and the sake of consistency with respect to the main example use case. However, it should be noted that motors 360 could be coupled with many other forms of locomotion besides wheels depending on the nature of the electric vehicle. For example, in the case of a boat or ship, motors 360 may be coupled with a propeller, an impeller, a fin, a sail, or other forms of water-based locomotion. Further, in the case of an aerial vehicle (e.g., manned vehicle, unmanned vehicle, etc.), motors 360 may be coupled with a propeller, a ducted fan, a wing, a control surface, or other form of aerial control. Thus, wheel instruction set 337 can be generalized and considered to represent a set of instructions targeting motors 360, which in turn operate on controllable elements of the vehicle. Such more generalized instructions are euphemistically represented by operation instruction set 339. Therefore, in some embodiments, wheel instruction set 337 can be considered a subset of operation instruction set 339. Still, operation instruction set 339 can include instructions beyond controlling motors 360, possibly including shifting weight of a payload, controlling tire pressure, controlling air conditioning, controlling wipers, controlling orientation (e.g., pitch, yaw, roll, angle of attack, etc.), or other type of control.

The elements stored in or otherwise instantiated in memory 330 are not necessarily static data structures but could also comprise dynamic features. Each element, in more preferred embodiments, may be permitted to change in real time as controller 320 observes its local environment or receives information from a remote server. Therefore, the values in the corresponding data structures could change or the elements could comprise executable codes that could change, possibly including swapping out executable modules, changing which APIs are called, or other forms of changes.

Further the elements stored in memory also provide an initial overview of a flow of operations performed by controller 320. For example, controller 320 is provisioned with one or more of software instructions 331 by which controller 320 functions. Controller 320 obtains location data from location sensor 340 and uses the location data to retrieve one or more operational profiles (e.g., a torque profile, etc.) from a profile database. Controller 320 further observes the local conditions via sensors 345 and creates local context 335 based on the environmental data obtained from sensors 345. Controller 320 could then create operation instruction set 339, including wheel instruction set 337.

Controller 320 could then execute the operational instructions, preferably in real time, to enable motors 360 to take corresponding actions (e.g., cause wheels to turn, etc.).

Figure 4:
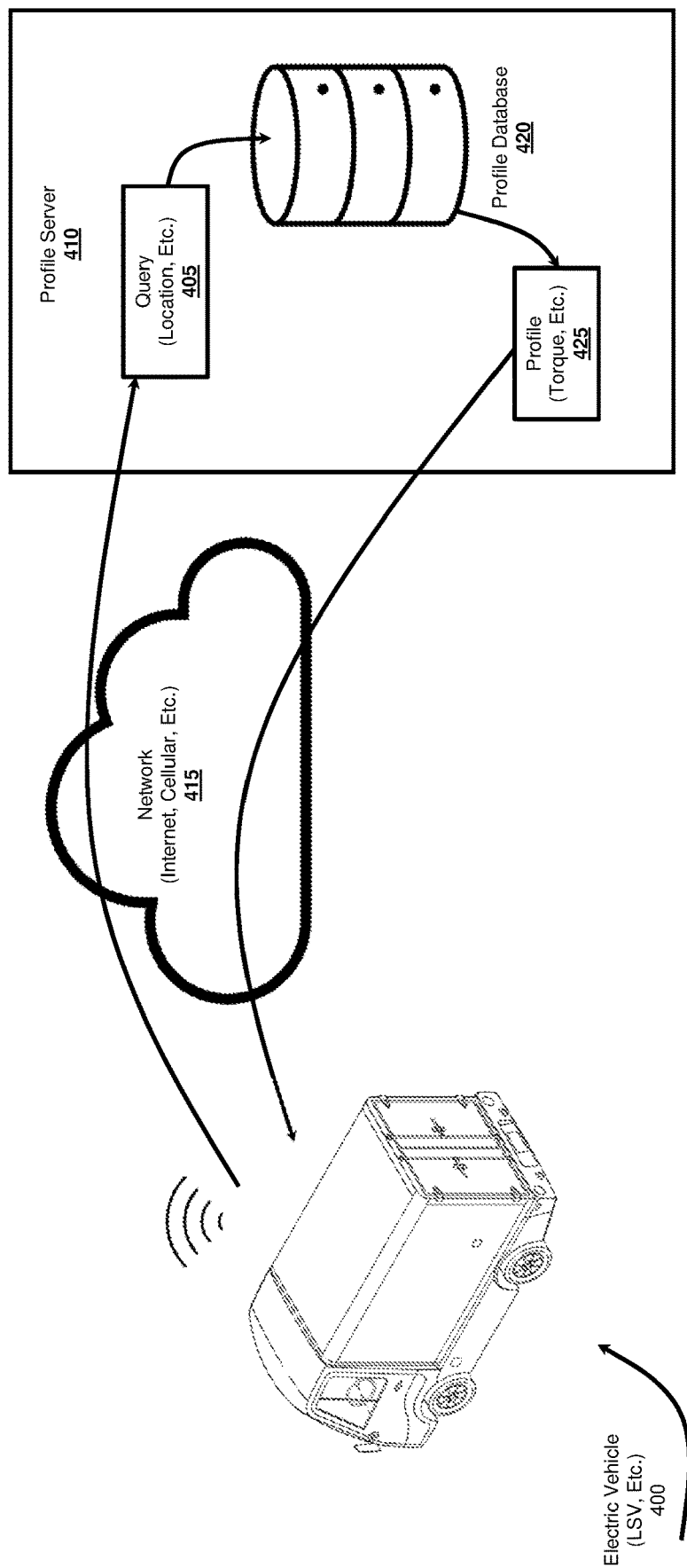
FIG. 4 provides an example method of obtaining an operational profile for an electric vehicle according to some embodiments.

FIG. 4 illustrates a possible approach by which LSV 400 is able to retrieve an operational profile 425 from profile database 420. Operational profile 425 may typically comprises one or more of a torque profile by which the LSV vehicular controller generates commands for the motors of the LSV. Still, operational profile 425 may also include other forms of operational capabilities beyond motor control.

In the example shown, LSV 400 obtains location data from at least one location sensor, where the location data could be digitally encoded in different ways. For example, the location data could comprise geo-location coordinates, addresses, Google Plus codes (see URL maps.google.com/pluscodes), S2 cell identifiers, geo-fence identifiers, zip codes, or other forms of location data. LSV 400 can package the location data as a query targeting the index schema of profile database 420, possibly operating within profile server 410 remotely over network 415. In the example illustrated, LSV 400 generates query 405 and transmits the query over network 415 to profile server 410, possibly over a cellular network. In response, profile server 410 receives query 405 and, assuming authorization or permission is granted to LSV 400, submits a corresponding query to profile database 420. Note, the query submitted to profile database could be an unaltered form of query 405. However, it is also possible server 410 might translate or transform query 405 to a format understandable by profile database 420. Profile database 420 searches for records that have been indexed in a manner that satisfy query 405, especially satisfying the location data requirements in the query. Once one or more records comprising operational profiles 425 have been found, the corresponding operational profiles 425 can be transmitted back to LSV 400 over network 415.

While query 405 could comprise only the location data, it is also possible query 405 could comprise other information about the LSV as well, which may be used to further refine the result set from profile database 420. For example, query 405 could further include an identifier of the operator of the LSV, where the identifier can be used to obtain operational profiles to which the operator is permitted to use. Such an approach may be advantageous for insurance reasons, training reasons, safety reasons, or other purposes. Further, query 405 could comprise a set of LSV attributes describing the nature of the LSV's purpose. Example attributes could include a current configuration of the LSV (see modular configurations of FIG. 2), a current purpose of the LSV, an LSV identifier, a date or timestamp (e.g., age of LSV, date of manufacture, etc.), a current condition of the LSV (e.g., battery charge level, wear and tear indications, etc.), or other LSV information. Such additional query conditions, beyond the location data, aid in further refining the result set and thereby controlling the use of LSV 400.

While profile server 410 and profile database 420 are illustrated, more or less, as a cloud-based infrastructure, is should be appreciated that other forms of infrastructure are also possible. For example, LSV 400 could have a local profile repository that could be consulted without requiring communicating over network 415. In such cases, the vehicular controller of LSV 400 could operate as profile server 410 or profile database 420. Such cases are useful when LSV 400 is operating in a single, well-defined environment or operating in remote, unconnected locations. Still further, profile server 410 or profile database 420 could be shared among multiple versions of LSV 400. In which case, each LSV 400 could be a peer in a peer-to-peer network, where each LSV 400 could operate as the server or database for others via a local network (e.g., ad-hoc, P2P, mesh, LAN, WAN, etc.).

Figure 5:
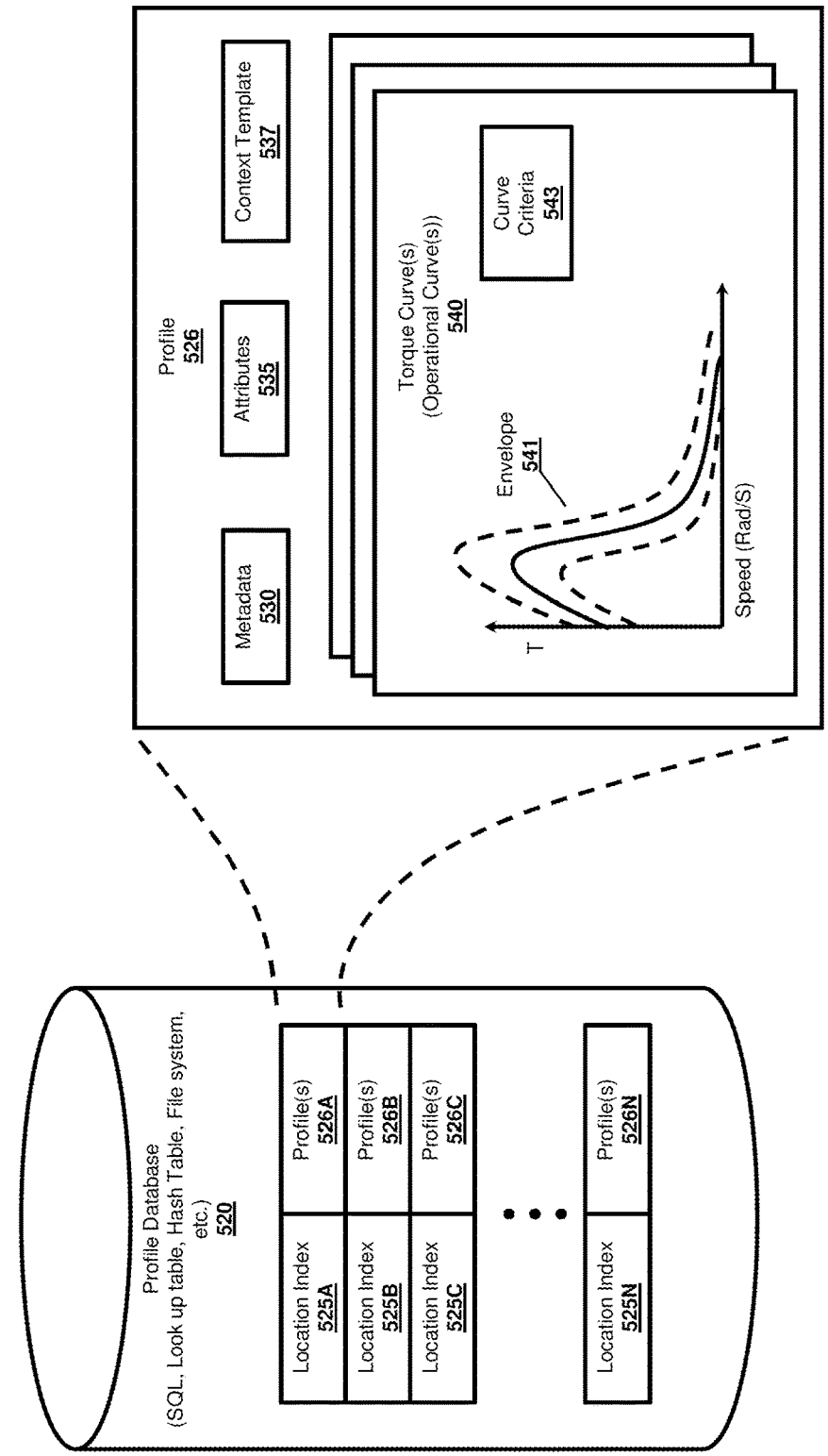
FIG. 5 provides an overview of a profile database and an operational profile for an electric vehicle according to some embodiments.

FIG. 5 presents a more detailed view of operational profiles that can be leveraged by the disclosed LSVs. Profile database 520 represents a data store housing one or more of operational profiles 526A through 526N, collectively referred to as profiles 526. Each profile in profiles 526 is preferably indexed by one or more of location index 525A through 525N, collectively referred to as indices 525. Profile database 520 can store profiles 526 in many different ways. Still, in more preferred embodiments, each profile of profiles 526 can be retrieved based on a location-based query. For example, profiles 526 can be directly indexed via corresponding coordinates (e.g., longitude, latitude, etc.). Further, indices 525 could representing an indirect set of indices derived from a location coordinate; possibly where a geo-location is converted to a geo-fence identifier and where indices 525 could correspond to geo-fence identifiers. In some embodiments, profile database 520 could operate as a torque profile database where profiles 526 are torque profiles.

In the example shown, each profile has a single index. However, it should be appreciated that a single profile could be indexed via multiple indices where a single profile might be relevant for more than one location. Such use cases are advantageous because it provides for creating a template profile or a default profile that could apply to locations have common features (e.g., desert, nature park, etc.). Further, a single index could link to more than one profile of profiles 526. Such an approach provides for nested or layered operational profiles for a single location. Profile database 520 can be implemented via different ways possibly including an SQL database, look-up table, hash table, file system, or other technique providing indexed data. In some embodiments, the profile database 520 may operate in a remote server over a network. However, it is also possible to place or store profile database 520 in the memory of the vehicular controller (e.g., FIG. 2, controller 320's memory 333, etc.).

Beyond location indices 525, each of the operational profiles can carry additional information as represented by metadata 530 or attributes 535. Queries targeting profile database 520 may also be formed based on the metadata 530 or attributes 535. Thus, the queries can become more complex than merely comprising location data. In response to more complex queries, database 520 generates a result set of profiles 520 that satisfy the query, including providing profiles having metadata 530 or attributes 535 that satisfy the query. Metadata 530 represents data describing the nature of the data related to the profile (e.g., creation time, data size, data formatting, version number, etc.). Attributes 535 provide additional information related to the overall profile and could include a profile owner, relevant vehicle information (e.g., make, model, year, etc.), target weather conditions, or other information.

Profile 526, in more interesting embodiments, include one or more of torque curves 540. Torque curves 540 provide details to the LSV vehicular controller on how to manage the torque of a motor in order to drive one or more wheels of the LSV. Thus, the vehicular controller uses torque curves 540 to determine or otherwise establish commands or instructions submitted to the motors (e.g., setting register values, setting PWM values, etc.). Further, torque curves 540 can also comprise one or more curve criteria 543 by which the LSV vehicular controller determines which curve to use or even which portion of a curve to use. For example, curve criteria could comprise instructions on which of curve 540 to use when raining or what point on the curve to use when starting or stopping the LSV. Yet further, curves 540 can comprise one or more operational envelopes 541 that sets a boundary around a corresponding curve. Envelopes 541 may be used to set boundary conditions that should not be exceeded when applying torque to the motors given a set of conditions. While envelop 541 may be used to set restrictions, the restrictions are not required to be on or off but could be based on a spectrum of conditions. For example, envelope 541 may be exceeded based on current conditions (e.g., emergency, weather, etc.).

One should appreciate that torque profiles could apply to different wheel configurations. In some embodiments, a torque profile may only apply to a single motor driving a rear-wheel drive LSV. In some embodiments, a motor can engage a single axel via a reduction drivetrain or transmission (e.g., 13 to 1, etc.). Further a torque profile could apply to a single motor. Thus, for example, a four-wheel vehicle could comprise four hub motors that each drive a single wheel. Such an approach is advantageous because it permits each motor to operate under different profiles, possibly in cases where one set of wheels are on one type of terrain (e.g., grass) while another set of wheels are on a different type of terrain (e.g., sand). Said differently, the torque profiles may apply to a single motor to account for more than one, two, three, or more terrain types. Therefore, torque profiles may apply to a wheel-by-wheel basis, motor-by-motor basis, axel-by-axel basis, or other practical configurations. Additionally, more than one torque profile may be applicable to a single motor so that two, three, five, 10, or more profiles may be returned from profile database 520.

While torque curve 540 is illustrated as radial speed, in radians per second, versus torque (T), there is no restriction on how the curve can be represented in a digital format. For example, torque curve 540 can further comprise a torque adjustment curve that governs how motors should behave with respect to torque from one point in time to another (e.g., starting, stopping, accelerating, decelerating, etc.). Such adjustment curves are advantageous especially when local conditions change due to shifts in terrain as the LSV moves from area to area, to changing weather conditions, to safety concerns, or other factors. Of note, the adjustment curves can include acceptable torque as a function of time. In such cases, envelope 541 may include restrictions with respect to the rate at which torque is applied or changes. Thus, the torque adjustment curves may include acceptable rates of change in applied torque based on time, or higher derivatives in time (e.g., $2^{nd}$ order derivatives, $3^{rd}$ order derivatives, $4^{th}$ order derivatives, etc.). Such higher order derivatives in time may be used in conjunction with other operational parameters beyond torque as well. One advantage of using higher order derivatives includes smoothing transitions from one state of operation to another state by ensuring the changing operational parameters from state to state have matching or similar values of higher order derivatives at a specific time or during a transition period even as the lower order derivatives change. Interestingly, a path taken mathematically to create a match for higher order derivatives for a specific action (e.g., acceleration, etc.) does not have to be the same, albeit reversed, path taken when performing an opposite action (e.g., deceleration, etc.). Thus, there can be a hysteresis between such paths. Said differently, the ramp down behavior of a set of operational parameters (e.g., speed, etc.) does not have to be the same as the ramp up behavior.

In some embodiments, profile 526 can further include context template 537 representing rules or instructions by which the vehicular controller may adjust the corresponding operational parameters of the LSV. Context template 537 can comprise a set of triggering events that cause specific actions or operational adjustments to take place. One should appreciate that context template 537 might not have actual values for event triggers, but rather one or more sets of criteria by which the events are triggered. More specifically, as the vehicular controller observes the local environment via sensor data, the vehicular controller can use the sensor data to determine which triggers should fire or to determine which set of criteria for triggering the event is most relevant at a current instant in time. Context template 537 can be encoded as a markup file, script, or other machine-readable format. Further, context template 537 can be defined in terms of the operational curves (e.g., torque curve 540), especially with respect to envelope 541 to ensure operational parameters do not exceed defined limits. Additional details regarding local contexts, possibly based on one or more of context template 537 are described with respect to FIG. 7.

Although FIG. 5 focuses on torque, one should appreciate profiles 526 can include other operational profiles beyond torque or in addition to torque. In a similar vein, where torque curves 540 apply to the operational parameter of torque, operational profiles can include other types of operational curves as well as the criteria triggering when such operational curves are employed. Thus, operational profiles can include parameters including one or more of the following in addition or alternatively to torque: tire pressure, battery discharge rate, battery recharge rate, air conditioning use parameters, electrical loading, weight or loading parameters, or other types of operational parameters. As an example, consider tire pressure. In some embodiments, the LSV can be equipped with self-inflating tires. As the LSV traverses various terrains, the vehicular controller can consult an operational profile provisioned with tire pressure parameters and thereby generate one or more instructions to change the pressure of the corresponding tire or wheel. The pressure may be increased to reduce friction to ensure optimal performance on solid surfaces (e.g., pavement, etc.). Additionally, the pressure may be decreased on softer surfaces (e.g., sand, mud, lawn, etc.) to enhance friction for better grip.

Figure 6:
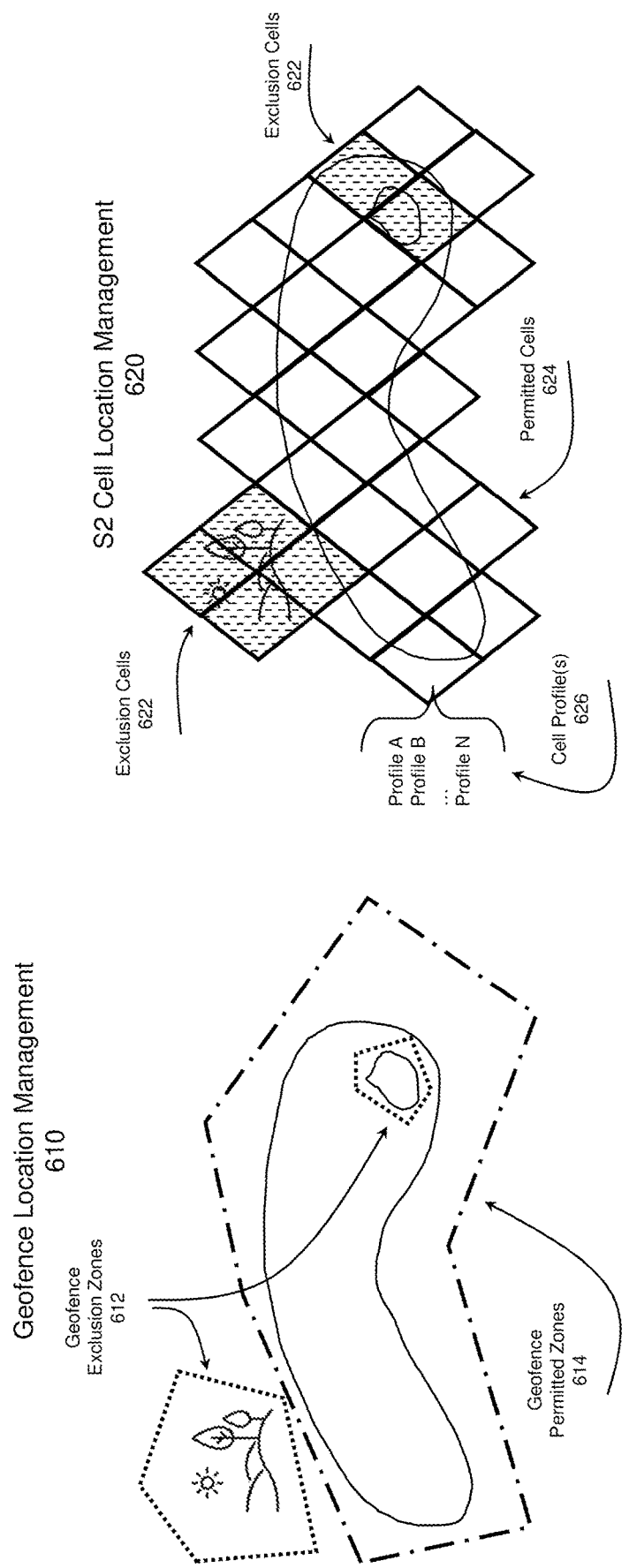
FIG. 6 illustrates example techniques for partitioning an environment based on terrain types according to some embodiments.

FIG. 6 provides an overview of how operational profiles may be used in relation to a geolocation of an LSV. FIG. 6 provides two example use-cases: geolocation fence management 610 and S2 cell location management 620. Starting with a focus on geolocation fence management 610, consider the area as illustrated, a golfing fairway and green similar to environment shown with respect to FIG. 1. As discussed previously, such environments may have multiple terrain types or other environment zones. In the example shown, there are two main zones: a set of geofence exclusion zones 612 and at least one geofence permitted zone 614. As suggested by their names, exclusion zones 612 are constructed to restrict an LSV from entering such zones; say exclude or restrict an LSV from driving on the green or be restricted from operating in the natural area. While it is possible to simply have a NULL set of operational profiles for such zones when the LSV enters the zone, it is also possible to have a set of operational profiles that explicitly provide command infrastructure for the motors, wheels, or other features of the LSV. For example, operational profiles from exclusion zones 612 might include operational adjustment curves that require the LSV to decelerate to zero speed when entering the zone. Further, the corresponding profiles might only permit the LSV to move in a direction toward a closest boundary of the zone to allow the LSV to leave the area, perhaps slowly (e.g., less than 5 mph, etc.) coupled with rolling without slipping. Interestingly, in such situations, the local context becomes more important to further refine how the LSV behaves. More specifically, instructions for the motors, wheels, or other operating features may be refined to account for the orientation of the LSV to determine which directions are forward or backward, to account for safety or emergency considerations, to account for actions taken by the operator, or to account for other factors. Use of geofences provides for course grained control over operational profiles, but also provides for creating well defined boundaries that are more natural to the environment.

Example techniques for managing geofences include those provided by Google® Geofencing API (see URL developers.google.com/location-context/geofencing). From a practical sense, an LSV's location data (e.g., GPS geolocation, observed location, etc.) may be used to identify a specific geofence zone, possibly having a zone identifier. The zone identifier may be used as a geofence query to one or more profile databases to retrieve a result set of relevant operational profiles. As illustrated in the geofence location management example, such zones may be nested, overlap, or otherwise impact each other. In such cases, operational profiles may be given priority values, possibly as an attribute of the profiles, to allow the vehicular controller to determine which profile should take precedence over others (e.g., higher value is high precedence, lower value is high precedence, etc.).

Turning toward S2 cell location management 620, the same environment could be tessellated with area cells as illustrated. S2 cells represent a method by which an area may be partitioned into cells using a Hilbert curve. An advantage of S2 cells is each cell has a unique, well-defined identifier where neighboring cells have similar identifiers due to the nature of the Hilbert curve. This is advantageous because it permits a computer system to use identifiers or portions of the identifiers to find neighboring cells, which in turn, permits the disclosed systems (e.g., see profile database 420 in FIG. 4), to find profiles for a target cell or group of related cells. Example techniques describing S2 cells and identifiers may be found at URLs s2geometry.io and github.com/google/s2geometry.

The cells may overlap or not overlap as desired by the target implementation. In more preferred embodiments, the cells completely cover the target environment as illustrated. Further, in principle large geographic regions (e.g., city, zip codes, counties, states, countries, continents, the entire planet, etc.) could be covered via such cells. In view that each cell has a unique identifier, corresponding operational profiles may be indexed by the cell identifiers, possibly using a hierarchical tree data structure. Thus, queries having an identifier of a course grained cell can return a result set of profiles for more fine-grained cells related to the identifier. Thus, a single cell might return a single profile, multiple cell profiles 626 as illustrated, no profiles, or even profiles from neighboring cells as well as a target cell.

Similar to geofence location management 610, S2 cell location management 620 can include different types of zones, which could impact the nature of the corresponding operational profiles. For example, some cells may be identified as exclusion cells 622, which restrict operation of the LSV as discussed above. Alternatively, cells may be identified as permitted cells 624 where the LSV operation is not restricted or has less restrictions. FIG. 6 presents two types of zones, permitted zones and excluded zones; however, zones may be defined according to any practical schema. Example zone definitions or categories could include maintenance zones, safety zones, grounds-keeping zones, emergency zones, or other types of zones. In such cases, operational profiles could default to the corresponding zone's default profile definition or default template if no a priori defined profiles exist for the target area. Use of S2 cells are advantageous from the perspective of fast memory look-up based on cell identifiers and the ability to tessellate an area. However, S2 cell may be less advantageous because they do not necessarily provide for fine-grained alignment to natural boundaries. Thus, in some embodiments, a hybrid approach of using geofences to define a zone and then using S2 cells to tessellate a zone may be of high value.

There are additional technologies that may be employed for zone management beyond geofencing and S2 cells without departing from the nature of the inventive subject matter. Examples include use of Google® plus codes, which operate somewhat similarly to S2 cells (see URL maps.google.com/pluscodes). Example map management technologies include Google® maps API or Microsoft® Intelligent Maps API both offers executable services providing access to maps. Further, OpenStreetMap offers access to a user created set of map-related services via an open-source model (e.g., see URL www.openstreetmap.org).

Figure 7:
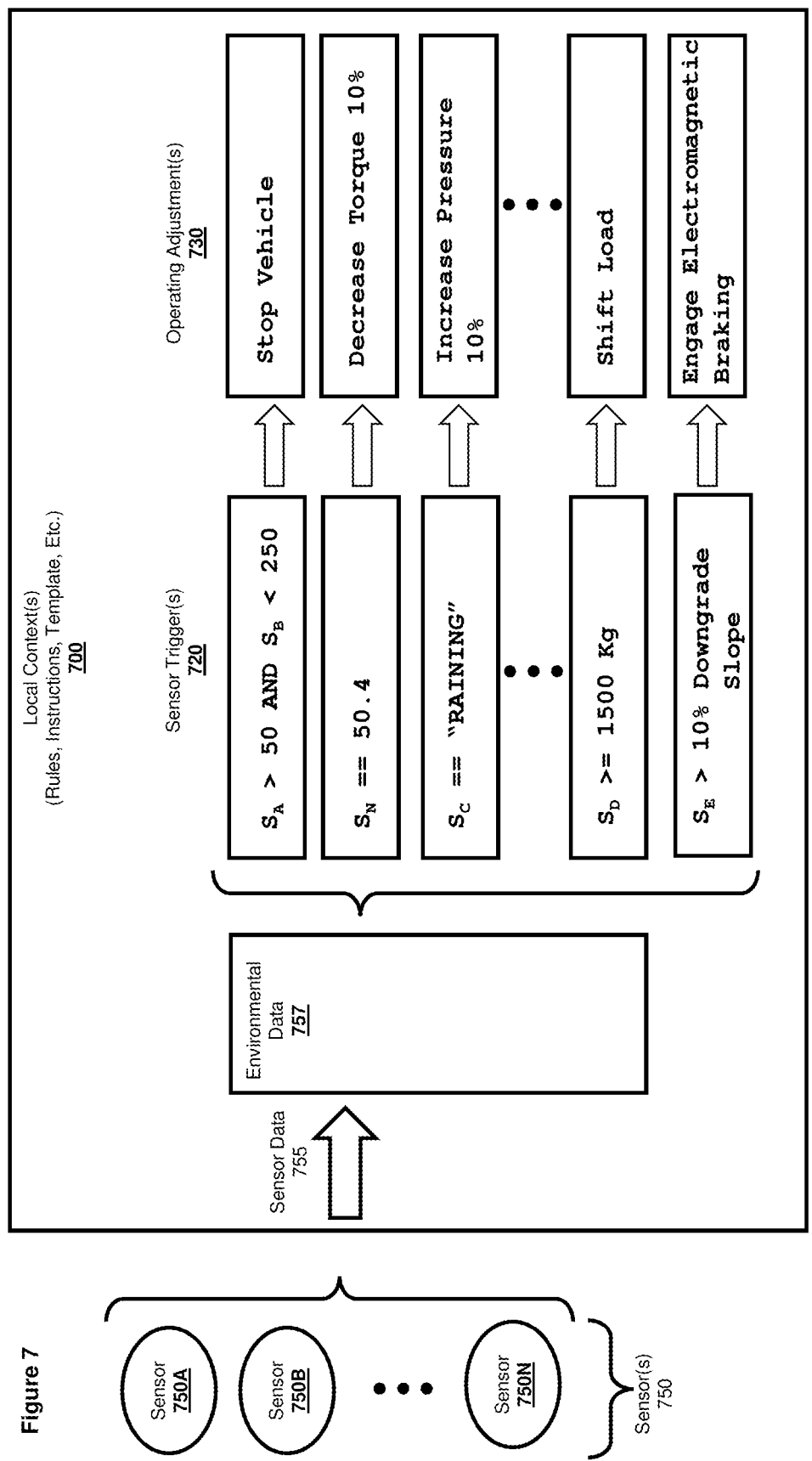
FIG. 7 outlines an example use of a local context for electric vehicle according to some embodiments.

FIG. 7 illustrates a possible approach for use of a local vehicle context 700 to refine actual functionality of an LSV based on an operational profile. Local context 700 can be considered a set of digital local environment data 757 obtained from a set of sensors 750 (e.g., sensors 750A through 750N, etc.) as well as various rules. As the vehicular controller collects sensor data 755 from sensors 750, the vehicular controller builds up, derives, or otherwise compiles the corresponding environmental data 757 for use with local context 700. Local vehicle context 700 can take on a broad spectrum of forms. For example, local vehicle context 700 could comprise a base, but empty, template (e.g., XML, YAML, JSON, etc.) found within the corresponding operational profiles where the template has rules, values, code, scripts, or other programmatic features the vehicular controller may use to create a provisioned local context. In the example shown, local vehicle context 700 comprises a set of sensor triggers 720 by which the vehicular controller may (or might not) take action. Sensor triggers 720 are presented to illustrate that environmental data 757 or sensor data 755 can operate based on many different types of data including text values, integer values, derived values, calculated values, floating point values, or other types of values. Further, sensor data 755 and the resulting environmental data 757, in more preferred embodiments, may be collected in real-time where the vehicular controller can take immediate action based on the observed state of the LSV. As an example of the data flow, sensor data 755 may include a data from a moisture detector, which returns a value of 0 to 255. The corresponding environmental data 757 could simply include the exact same value, possibly as a pass through. However, environmental data 757 could also be the derived value "RAINING" which may be derived by converting the raw value to the derived value via a corresponding conversion function, possibly implemented as a look-up table or as a set of rules.

While the above immediate discussion indicates local context 700 could be a template provided by a corresponding operational profile, one should appreciate that such an implementation is not the only technique for implementing local context 700. In other embodiments, the vehicular controller can have a local context agent (e.g., software, modules, etc.) that executes on the vehicular controller. The local context agent can monitor the local environment conditions and then submit the conditions (e.g., via API, via memory mapped 10, etc.) to an executing profile. The profile itself, also possibly operating as an agent, task, thread, or other set of instructions can then generate appropriate instructions for execution. Thus, local context 700 could be considered as an integral part of an operational profile or could be a distinct set of code from a corresponding operational profile, but yet able to informationally couple with the operational profile. Such communications may also be bi-directional.

As sensor data 755, and the corresponding environmental data 757, flows into the vehicular controller, the vehicular controller monitors sensor triggers 720, which may operate as listeners. When the vehicular controller determines that one or more of sensor triggers 720 have rules that are satisfied by the local environmental data 757, or other data, the vehicular controller can then generate a corresponding set of instructions (e.g., motor instructions, wheel instructions, operating instructions, etc.) according to the corresponding operational profile as by informed local context 700. For example, one or more operating instructions may be registered with the corresponding listeners for sensor triggers 720. Thus, when the listener has its corresponding criteria satisfied, the instruction can be executed, compiled, submitted to the target device, or otherwise prepared for execution.

In the example shown in FIG. 7, a set of operational instructions are presented as a set of operating adjustments 730. Operating adjustments 730, in addition to being executable commands, can be also considered a set of changes to the operating conditions of the LSV. For example, during operation a tire pressure might be increased in units of 10% per unit time as the LSV transitions from one terrain type (or zone) to another until a desired pressure is achieved. It should be appreciated that the operating adjustments can take on a wide range of possible operating instructions, possibly including a stop instruction, a shift load instruction, an accelerate or decelerate instruction (e.g., increase or decrease torque, etc.), an operator notification instruction, a battery charge instruction, or other type of instruction relating to the operational parameters of the LSV. Still further operating adjustments 730 could leverage electromagnetic braking, which may be used to recharge the batteries of the LSV. In the example shown, when the vehicular controller detects a downward slope, the controller may automatically engage electromagnetic braking to control the speed of the vehicle, possibly for safety reasons, and to recharge the batteries. Although the corresponding sensor trigger 720 for electromagnetic braking is illustrated as a single criterion, any practical number of criterion may be combined to form the trigger (e.g., speed, position, orientation, operator, battery level, etc.).

Recall the LSV can have many different types of configurations where motors impact the performance of one, two, or more wheels. Thus, a set of wheels (e.g., one, two, three, four, or more wheels) can operate individually or collectively based on their corresponding motor or motors. In such cases, the instructions generated by the vehicular controller could comprise different instructions for two different wheels at the same time. Additionally, the different instructions may be representative of two (or more) different terrain types. This is considered advantageous in cases similar to where an LSV might be stuck halfway into a ditch or sand and still be halfway on pavement for example. More specifically, the tire pressure for the sand wheels might be decreased for better grip, while torque on the pavement wheels might be increase because those wheels have more established contact with the surface. Thus, the result can include instructions for the motors to turn the wheels in a manner the promotes rolling without slipping.

Once a set of operating instructions have been established, or are instantiated in real time, the vehicular controller executes the set of instructions to thereby enable the corresponding operating features of the LSV to take action. For example, in the specific example of motor torque as an operating parameter, the controller executes the generated set of wheel instructions to enable the motors to cause the set of controllable wheels to take the desire corresponding action.

The above discussion has mainly focused on wheel-based LSVs. However, the described inventive subject matter is also applicable to other types of electric vehicles in view that nearly any kind of vehicle having motor-driven propulsion could leverage the location-based operational profile management features. Example vehicles can include boats, ships, planes, drones, autonomous vehicles, motorcycles, single wheeled vehicles, unmanned vehicles, fan driven balloons, zeppelins, lighter than air crafts, snowmobiles, or other types of devices. Thus, by extension, motors do not necessarily have to be coupled to wheels, but could be coupled to other types of propulsion (e.g., treads, impellers, ducted fans, water or air propellers, robotic legs, etc.). Consider drones as an example. Electric drones are used for many purposes from hobby use-cases to military use-cases. Location-based operational profiles for such drones could include profiles to control maximum rotation speed of the drone's propellers in order to reduce noise (e.g., over a neighbor, over an active battlefield, etc.). Further, such restrictions can be further modified based on the local context, possibly based on ambient noise levels (e.g., raining, battle noise, highway noised, etc.), to alter the restrictions. More specifically, if the local ambient noise is high, then the local context might modify the value of the maximum rotational speed by permitting the drone to lift more, move faster, or otherwise have faster rotational speeds. Thus, in additional to other use-cases, the inventive subject matter is considered to include noise abatement.

In a somewhat similar vein to drones, the disclosed techniques could be used for lawn care devices (e.g., lawn mowers, robots, etc.) including robotic lawn mowers or other types of autonomous devices. Rather than merely have a robot perform a single task in a bounded area, the robot can consult operational profiles for an area and possibly modify the profile based on the local context to proceed with designated tasks. Returning to the environment of FIG. 1, a robot or a fleet of robots could tend to the various terrains in the environment. For example, a single automated lawn mower could use the profiles to determine which type of blades to use for the type of grass or what height the blades should be for the type of grass. As the mower shifts from the fairway to the pavement, the blade deck can be raised to permit faster movement. Thus, operational profiles may be used to fine-tune how automated devices operate in an environment and further refine operational parameters based on the local conditions or contexts. Additionally, the lawn care example also illustrates the operational profiles can be used to manage non-propulsion features (e.g., the lawn mower blade, blade deck, etc.).

Up to this point in the discussion regarding the inventive subject matter, the disclosed techniques have been presented from the perspective of a single LSV. In addition to managing the operational parameters or performance of a single LSV, fleets of LSVs could also be managed via these techniques. Thus, many LSVs, or other types of electric vehicles, can work together in concert to create a globally optimized set of operational tasks. For example, multiple devices (e.g., a set of heterogenous device, a set of homogenous devices, etc.) could be optimized to reduce overall costs of charging, to reduce time to perform global activities (e.g., ground care, etc.), to increase coverage per unit time on surveillance footage, or other factors. In such widely varied multi-device use cases, each device could be governed by a single profile for a target zone and then modify the profiles for local conditions or each device could obtain a profile that it most relevant to its local area. Such approaches permit multiple devices to work together without conflicting with each other by sharing workloads or cooperating with each other. Returning to the lawn mower and golf course example in FIG. 1, multiple, possibly automated lawn mowers, could share mowing the fairway to reduce the amount of time necessary to complete the task. Further, an automated charging station could travel around the environment to automatically swap or charge batteries of the lawn mower so they do not have to spend time traveling to and from a charging station. Yet further, operational profiles could permit or restrict the number of devices in a specific area (e.g., proximity to each other, density of devices, etc.) to reduce potential interference with each other, to reduce wear on the terrain, to improve the logistics, or other factors.

Yet another interesting use case of the operational profiles relates to communications. Recall, in FIG. 3, the disclosed vehicular controller is shown as having a wireless communication interface (i.e., wireless communication 350). In some multi-device embodiments, it is possible that an environment might not permit all devices to access a central server or cloud infrastructure. In such cases, the vehicular controllers can establish a mesh or adhoc network for distributing operational profiles. For example, one or more LSVs that do have access to the profile database can download necessary profiles that are relevant to LSVs that are not connected to the profile database. Then, the profiles can be distributed to the various unconnected LSVs via the mesh or adhoc network via the wireless communications interface. Thus, LSVs can operate as a hub or proxy profile database or server.

In view an operating environment can be quite varied or there can be multiple vehicles operating in the same environment, there can be quite a diversity of operational profiles and/or corresponding local contexts. The diversity and possibly large number of profiles could be quite difficult to manage. Therefore, the inventive subject matter is considered to include infrastructure to support management of operational profiles. In more preferred embodiments, one or more web services (e.g., dashboards, APIs, etc.) are provided by which stakeholders are able to create or otherwise manage profiles. Such management services may be hosted on a local computer system, possibly for a fee, by which an environment manager can manage profiles or acceptable local contexts. In other scenarios, the services could be hosted on cloud-based systems, possibly accessed in exchange for a subscription fee. Preferred services offer multiple management functions including monitoring LSVs, inventorying LSVs and their individual capabilities or features, logging events generated by LSVs especially when the local context gives rise to potential conflicts about LSVs or with operational profiles, alerting stakeholders of specified events, reporting on conditions associated with one or more LSVs, recovering an LSV should adverse events take place, securing LSVs against unauthorized access or use, or engaging in other management functions.

Security can be considered a very interesting feature relating to the disclosed location-based profile management system. Operational profiles can further include security requirements, possibly in real-time, as LSVs move from position to position in an environment or as operators change. Thus, the operational profiles can include restrictions relating to the operator, who may be required to authenticate themselves when operating the LSV. Operational profiles can be provisioned with security features possibly including operator credentials or security protocols for establishing use (e.g., public key infrastructure (PKI), hash-based message authentication code (HMAC), Secure Sockets Layer (SSL), certificates, multi-factor identification, etc.). In some embodiments, an operator could be given a keyfob having a specific radio-frequency identification (RFID) value. The LSV's operational profile can be provisioned with the expected RFID value so that only the specific keyfob will permit access, assuming the LSV is equipped with a RFID reader. Interestingly, RFID readers also permit inventorying equipment loaded in the LSV to ensure it is able to perform a targeted task where the equipment is considered to have RFID tags.

Operational profiles can be provisioned with features that are dictated by external authorities possibly accounting for local laws, government regulations, existing standards of operation, or other factors. For example, templates for operational profiles in national parks can be provisioned with a priori restrictions where LSVs can operate safely or under what conditions the LSV should operate to protect the operator, the vehicle, or the natural terrain. Thus, the operational profiles can be based on various requirements including performance goals, economic goals, task goals, evidence of use goals, adherence to standards, or other factors.

LSVs may also be equipped with one or more displays that enable a local stakeholder or operator to interface with the vehicular controller. Displays can be configured to render one or more aspects of the operational profiles or local contexts so that the operator is able to determine how best to utilize the LSV. Further, providing profile information to the operator enables the operator to understand under what circumstances or restrictions the LSV is operating. For example, as an LSV is approaching an environmental feature (e.g., a change in zone, a change in terrain, etc.), the display can notify the operator of potential changes in behavior of the LSV. Again, returning to FIG. 1 for a more specific example, as an LSV approaches the steep hill as determined from the heading and speed of the LSV, the display can indicate the steep hill has a restricted area or display an acceptable path through to take the hill. Further, the display can present wear-leveling information to the operator, which is especially useful in sensitive zones or in multi-device environments.

Use of the LSV is not restricted to just the behavior of the LSV itself. In addition to the operational parameters of the LSV, operational profiles can be provisioned with implementations of one or more recognition algorithms (e.g., OCR, SIFT, action recognition, pattern recognition, etc.). OpenCV (see URL opencv.org) or SciKit Learn (see URL scikit-learn.org/stable) offer many different types of pattern recognition algorithms, including machine learning algorithms that can be leveraged to identify patterns or items in an environment. Such features are advantageous to identify specific uses of an LSV based on actual operator behavior. For example, should an operator use the LSV in an unacceptable manner, the operational profile can be used to interrupt or stop the observed behavior. In addition, a warning can be rendered on the display of the LSV. Such observations can be based on multiple operating parameters of the LSV including speed, orientation, position, turning radius, location, path, or other sensed parameter of the LSV.

Figure 8:
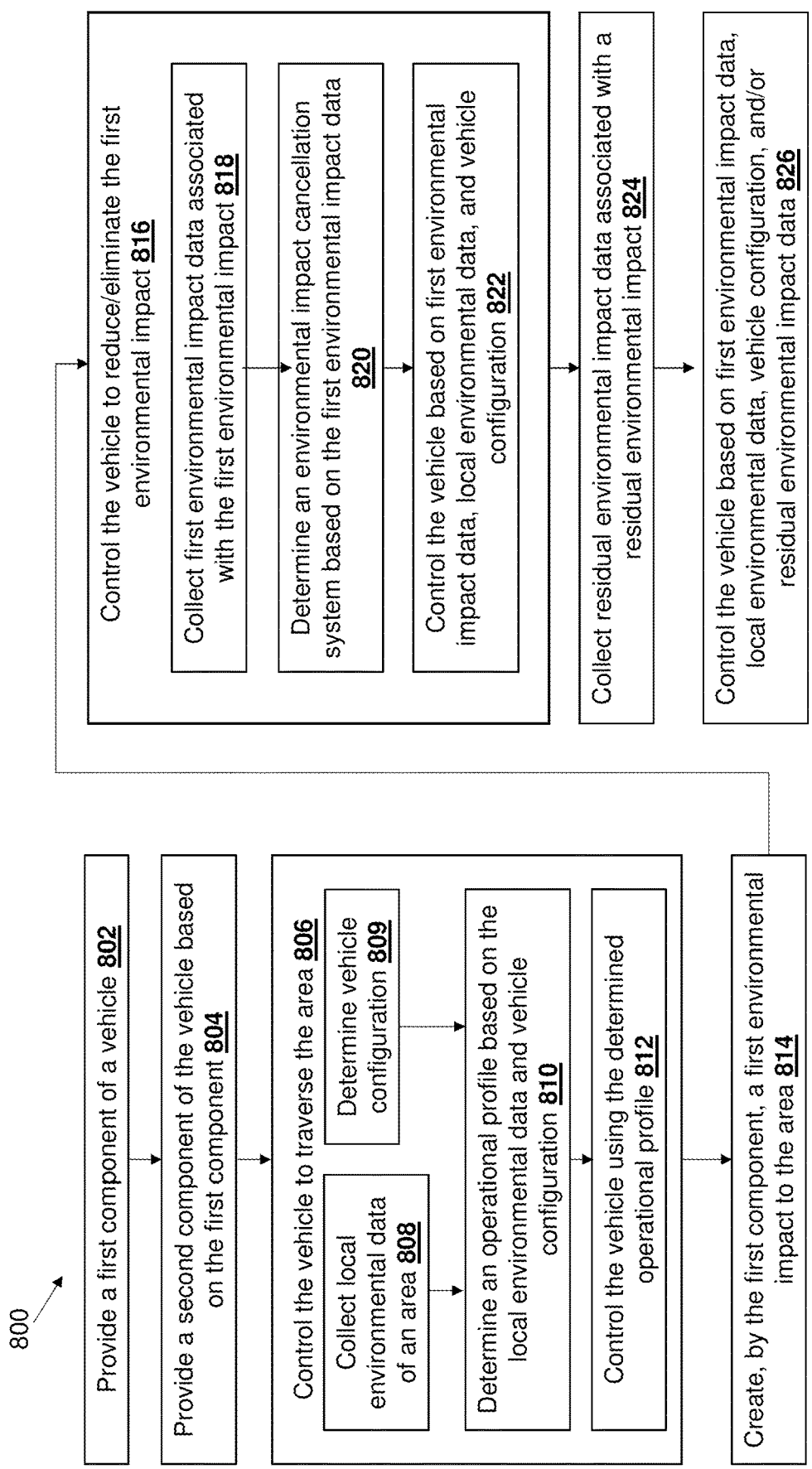
FIG. 8 is a flowchart of an example method for providing and controlling an electrical vehicle to minimize environmental impacts according to some embodiments.
Figure 9:
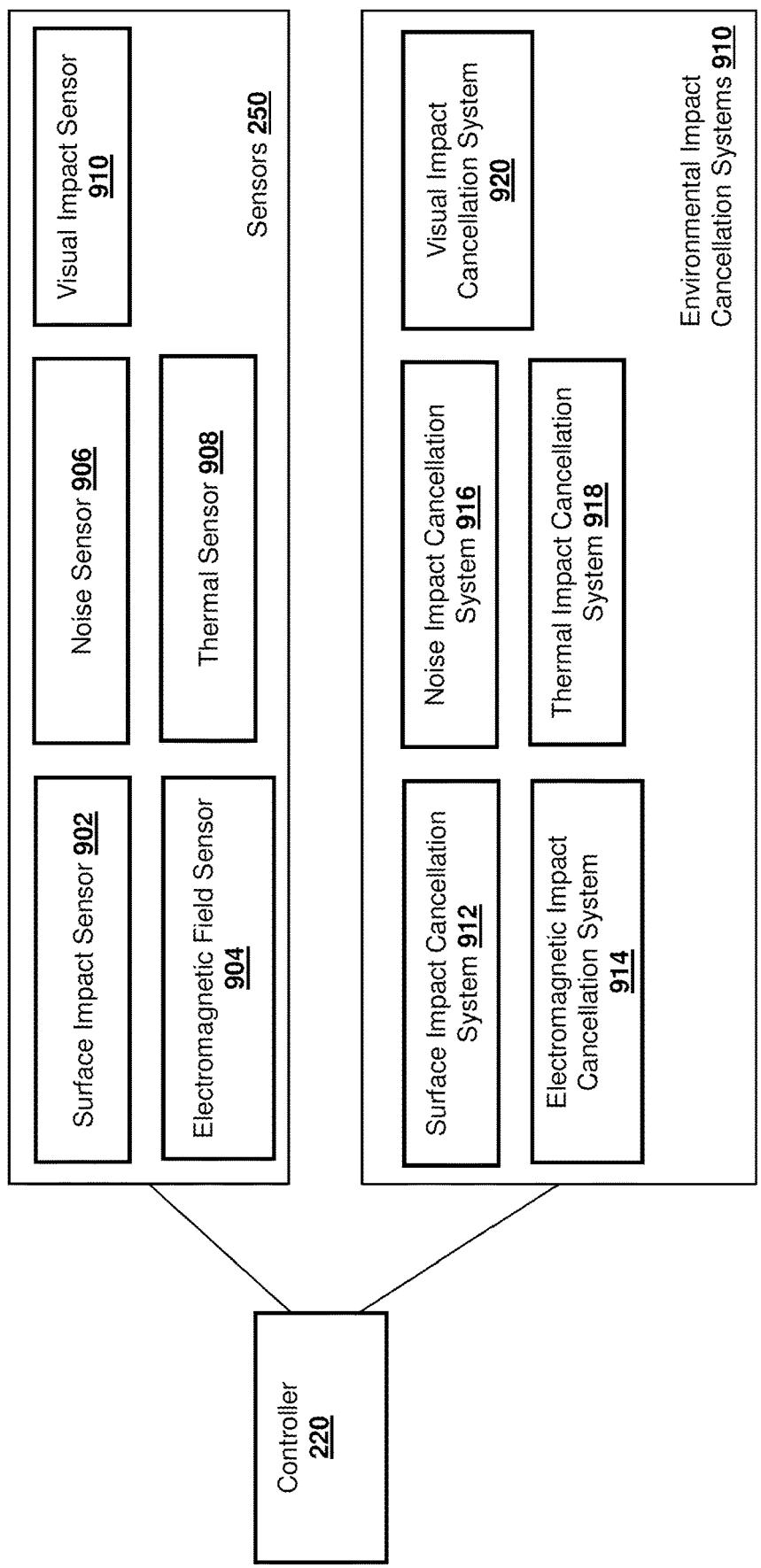
FIG. 9 illustrates example environmental impact cancellation systems used by a controller to minimize environmental impacts of a vehicle according to some embodiments.
Figure 14:
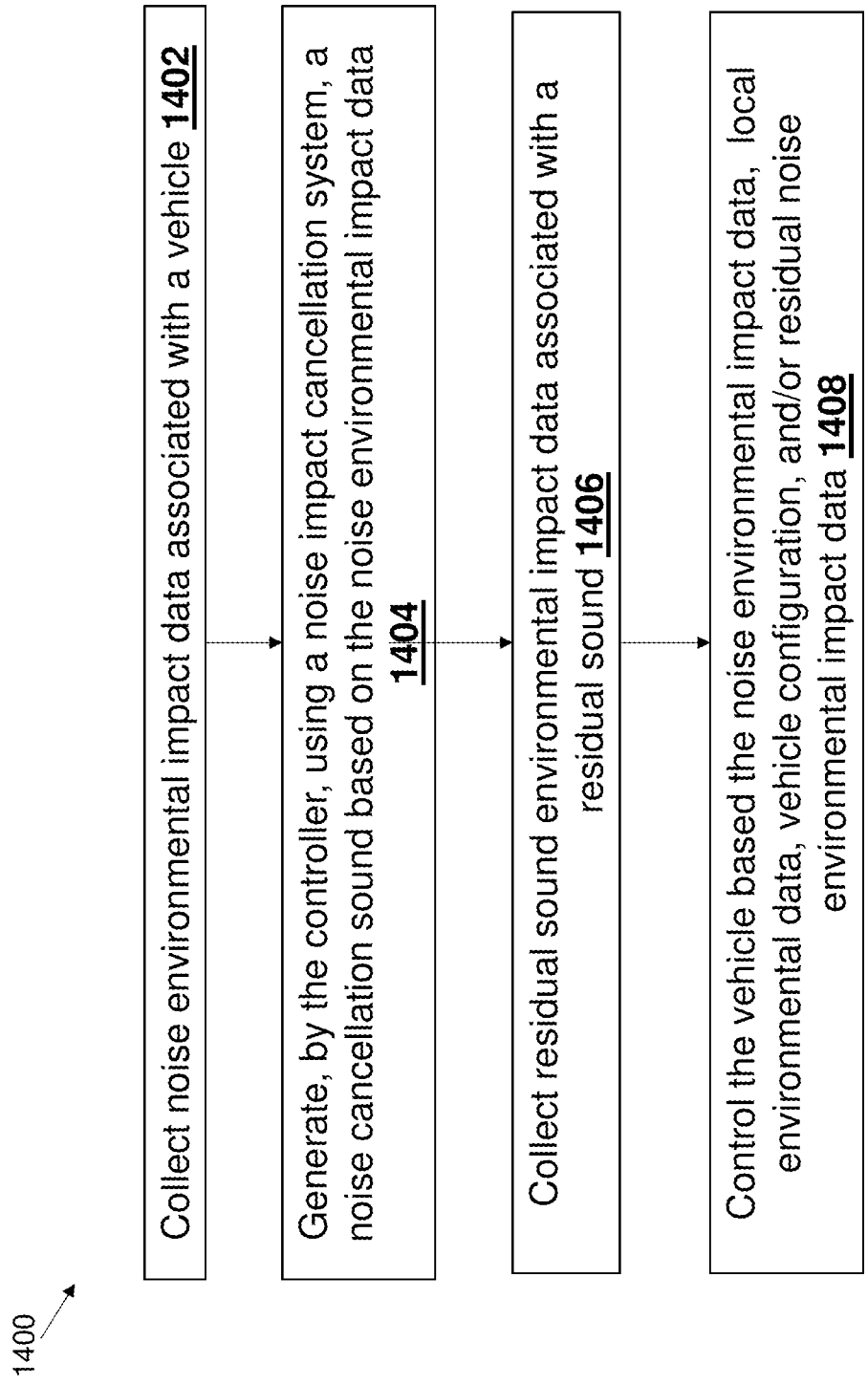
FIG. 14 is a flowchart of an example method for providing and controlling an electrical vehicle to minimize environmental impacts using noise impact cancellation according to some embodiments.
Figure 15:
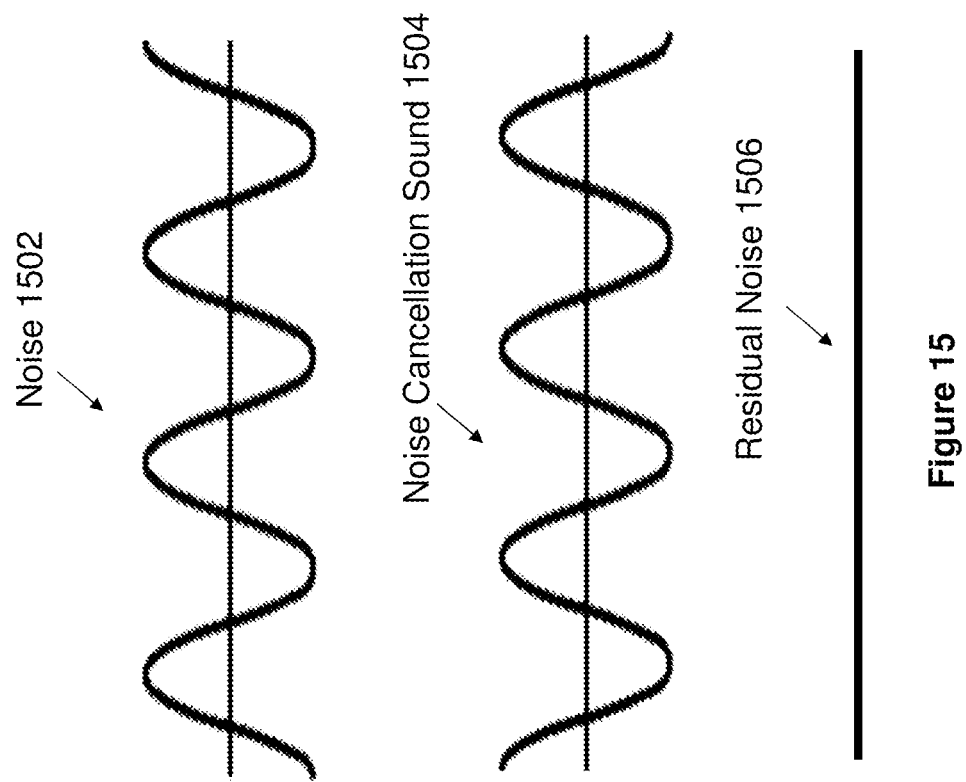
FIG. 15 illustrates example of sounds for noise impact cancellation according to some embodiments.
Figure 16:
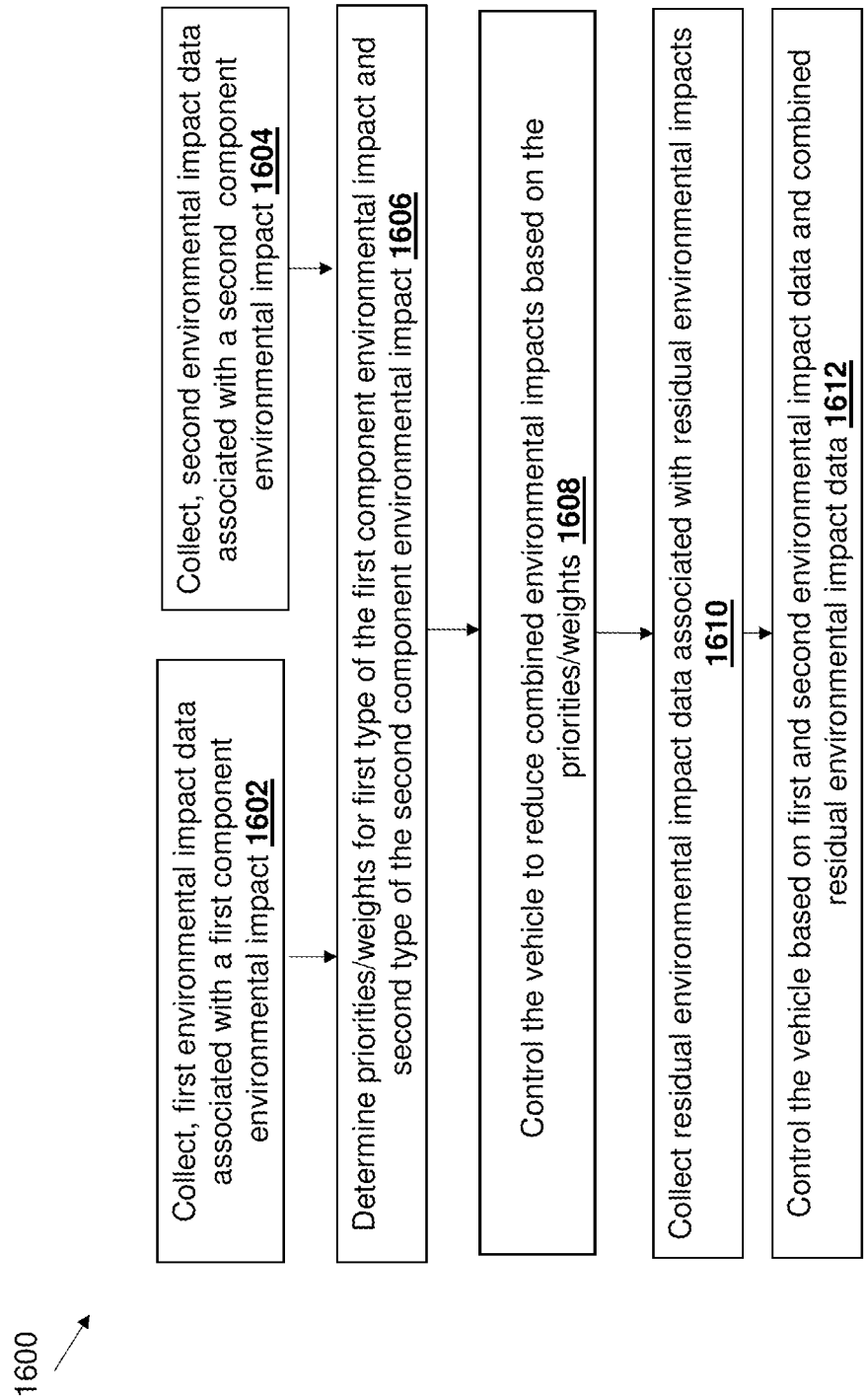
FIG. 16 is a flowchart of a method for providing and controlling an electrical vehicle to minimize combined environmental impacts using multiple environmental impact cancellation systems for different types of environmental impacts according to some embodiments.

Referring to FIGS. 8-16, examples of systems and methods for providing and controlling an electrical vehicle to minimize environmental impacts by using environmental impact cancellation systems are described. As shown in FIG. 8, in addition to using the local environmental data as described above, the controller of a vehicle collects environmental data including data of environmental impacts generated by the vehicle, and determines corresponding environmental impact cancellation systems for cancelling the environmental impacts generated by the vehicle. As shown in FIG. 9, various environmental impact cancellation systems may be used to cancel corresponding types of environmental impacts of a vehicle, including for example, surface impact, electromagnetic impact, noise impact, thermal impact, visual impact, any other suitable environmental impact, and/or a combination thereof. FIGS. 10-15 illustrate impact cancellation systems and methods for specific types of environmental impacts. FIG. 16 illustrates systems and methods for minimizing combined environmental impacts using multiple environmental impact cancellation systems for respective types of environmental impacts.

Referring to FIG. 8, an example method 800 for providing and controlling an electrical vehicle to minimize environmental impacts using environmental impact cancellation is illustrated. The method 800 begins at block 802, where a first component of a vehicle is provided. The first component may be any component of the vehicle that may create an environmental impact when the vehicle is traversing an environment. In an example, the first component includes a front tire or a back tire of the vehicle, which creates surface impacts (e.g., tire tracks) when the vehicle is traversing. where the environment. In another example, the first component includes various electronics of the vehicle, which creates electromagnetic impacts (e.g., electromagnetic fields of various frequencies, amplitudes, and phases) when the vehicle is traversing. In yet another example, the first component includes components creating noises (e.g., tires moving on the pavement, engines, horns) when the vehicle is traversing. In yet another example, the first component includes thermal elements of the vehicle that creates thermal impacts to the environment. In yet another example, the first component includes external surfaces of the vehicle that creates visual impacts to the environment.

Method 800 may proceed to block 804, where a second component of the vehicle is provided based on the first component. The second component may be designed based on the first component or the environmental impacts caused thereby. The second component may be used by the controller to reduce or eliminate the environmental impact created by the first component. In an example, the second component includes a trailing tire provided based on the leading tire (e.g., first component). The trailing tire may include a tread pattern based on the tread pattern of the leading tire for cancelling the tire track of the leading tire, e.g., using an inverse tread pattern of the tread pattern of the leading tire. The controller may control the vehicle such that the trailing tire follows the leading tire for cancelling the tire track of the first tire.

In another example, the second component may be associated with an electromagnetic impact cancellation system based on the first component that generates electromagnetic impacts. The second component may include various electronic components (e.g., coils, cables) of the electromagnetic impact cancellation system for generating an electromagnetic cancellation field of particular properties (e.g., frequencies, amplitudes, phases) to cancel the electromagnetic impacts generated by the first component.

In yet another example, the second component may be associated with a noise impact cancellation system based on the first component that generates noise impacts. The second component may include various electronic components (e.g., noise cancelling circuits including pre-amplifiers, delay or all-pass filters, summing amplifiers) of the noise impact cancellation system, which may generate noise impact cancellation sounds of particular properties (e.g., frequencies, amplitudes, phases) to cancel the noise impacts generated by the first component.

In yet another example, the second component may include components of a thermal impact cancellation system (e.g., ventilation components, shading components) for cancelling thermal impacts of the first component. In yet another example, the second component may include components of a visual cancellation system (e.g., surface display components) for cancelling visual impacts of the first component.

Method 800 may proceed to block 806, where a controller of the vehicle controls the vehicle to traverse the area. Block 806 may include various processes for performing vehicle control, e.g., using an operational profile. For example, at block 808, the controller may collect, using sensors, local environmental data of the area, and at block 809, the controller may determine the vehicle configurations, including e.g., the payload subsystem configurations. At block 810, the controller may determine an operational profile based on the collected information, e.g., the local environmental data (including e.g. terrain types) and vehicle configurations. At block 812, the controller may control the vehicle using the determined operational profile.

Method 800 may proceed to block 814, where a first environmental impact to the area is created by the first component. Method 800 may proceed to block 816, where the controller may control the vehicle to reduce or eliminate the first environmental impact. Block 816 may include various processes for performing environmental impact cancellation. For example, at block 818, the controller may collect first environmental impact data associated with the first environmental impact. As shown in the example of FIG. 9, controller 220 may collect environmental impact data using sensors 250. In an example, a surface impact sensor 902 (e.g., a camera) may be used to collect data for a surface impact including a tire track created by a leading tire. In another example, an electromagnetic field sensor 904 may be used to collect data for electromagnetic impact of the vehicle. In yet another example, a noise sensor 906 may be used to collect noise impact of the vehicle. In yet another example, a thermal sensor 908 (e.g., on or around external surfaces of the vehicle) may be used to collect thermal impact of the vehicle. In yet another example, a visual impact sensor 910 (e.g., a camera) may be used to collect visual impact of the vehicle.

As shown in the example of FIG. 8, block 816 may include process of block 820, where the controller determines an environmental impact cancellation system based on the first environmental impact data. As shown in the example of FIG. 9, controller 220 may determine a surface impact cancellation system 912 in response to a determination that the first environmental impact data includes surface impact data, an electromagnetic impact cancellation system 914 in response to a determination that the first environmental impact data includes electromagnetic impact data, a noise impact cancellation system 916 in response to a determination that the first environmental impact data includes noise impact data, a thermal impact cancellation system 918 in response to a determination that the first environmental impact data includes thermal impact data, and a visual impact cancellation system 920 in response to a determination that the first environmental impact data includes visual impact data. It is noted that in some embodiments, the controller may collect multiple types of environmental impact data and in response determine multiple environmental impact cancellation systems. As discussed in detail with reference to FIG. 15 below, in those embodiments, the controller may control the vehicle and the multiple environmental impact cancellation systems to minimize the combined residual environmental impacts.

Block 816 may include process of block 822, where the controller controls the vehicle and the determined environmental impact cancellation system (e.g., based on first environmental impact data, local environmental data, and vehicle configuration) to reduce the first environmental impact. In other words, a first environmental impact cancellation process is performed by the controller, using the determined environmental impact cancellation system, to reduce the first environmental impact to a residual environmental impact. In an example, the controller may control the vehicle using an operational profile for the determined environmental impact cancellation system, where the operational profile may be based on the first environmental impact data, local environmental data, vehicle configuration, other suitable data, and/or combination thereof.

Method 800 may proceed to block 824, where the controller collects, using the sensors, residual environmental impact data after the environmental impact cancellation process is performed. Method 800 may proceed to block 826, where the controller analyzes the residual environmental impact data and determines the effectiveness of the first environmental impact cancellation process. Based on the analysis, the controller may perform a second environmental impact cancellation process (e.g., using an updated operational profile with updated operational parameters) using the determined environmental impact cancellation system, making adjustments to the process (e.g., based on the residual environmental impact data, first environmental impact data, local environmental data, vehicle configuration, and/or a combination thereof) to further minimize the environmental impact. In various embodiments, the updated operational profile may be generated using machine learning model that has been previously trained using data for reducing various environmental impacts under various environments and vehicle configurations.

Figure 10:
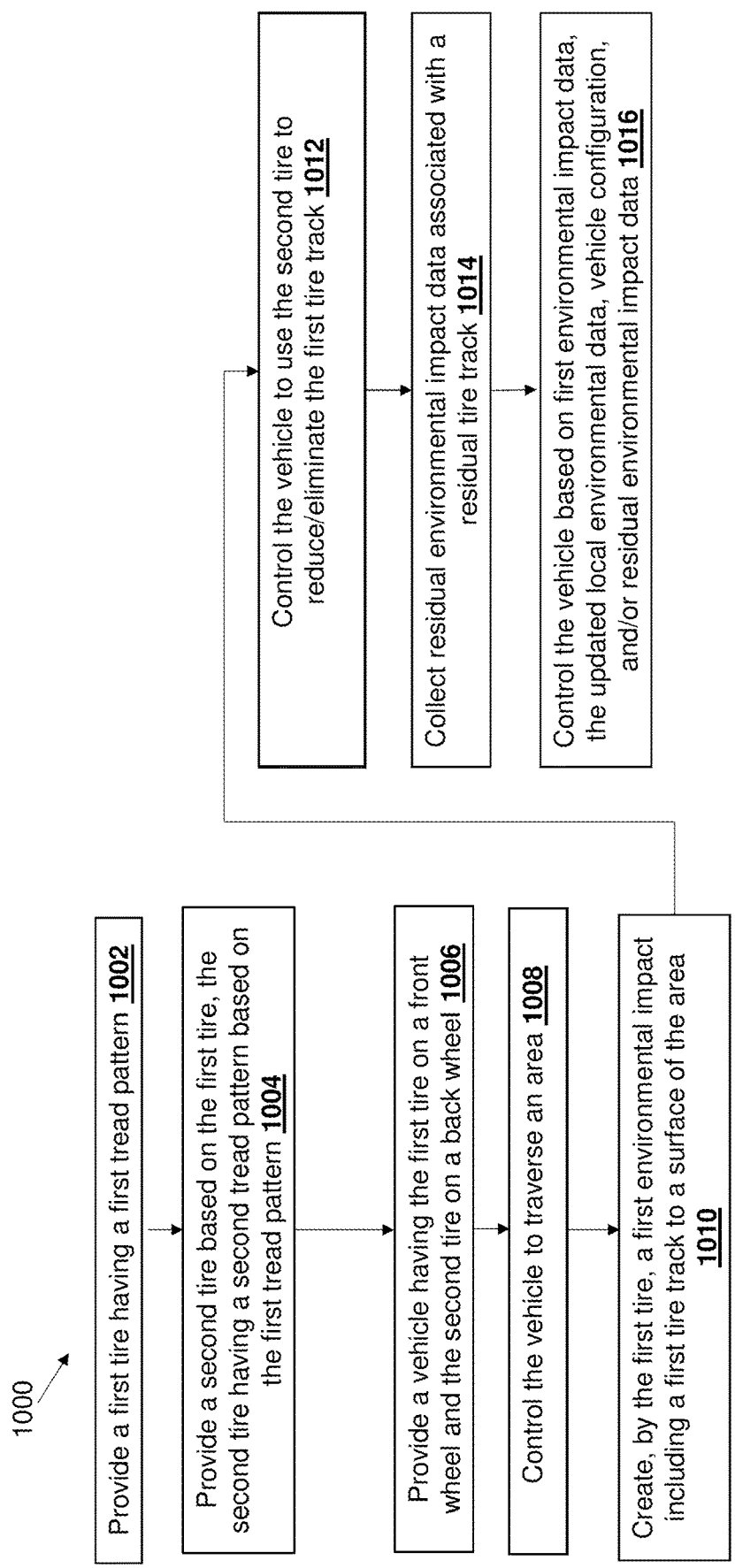
FIG. 10 is a flowchart of an example method for providing and controlling an electrical vehicle to minimize environmental impacts using surface impact cancellation according to some embodiments.
Figure 11:
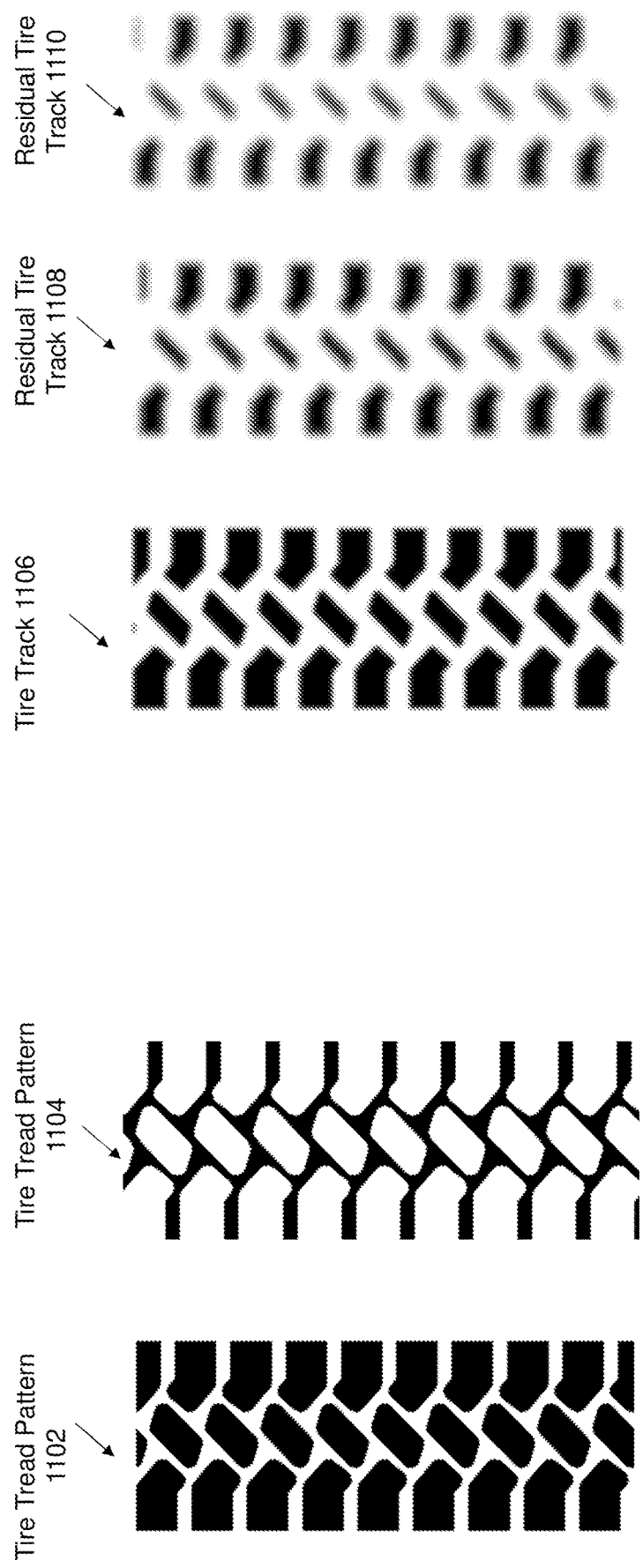
FIG. 11 illustrates various examples of tire tread patterns and tire tracks of an electrical vehicle for surface impact cancellation according to some embodiments.

Referring to FIG. 10 and FIG. 11, an example method 1000 for providing and controlling an electrical vehicle to minimize environmental impacts using surface impact cancellation is described. As shown in FIG. 10, method 1000 begins at block 1002, where a first tire having a first tread pattern is provided. Referring to FIG. 11, an example a first tread pattern 1102 is illustrated. Method 1000 may proceed to block 1004, where a second tire is provided based on the first tire, e.g., the second tire having a second tread pattern (e.g., tread pattern 1104 of FIG. 11) based on the first tread pattern (e.g., tread pattern 1102 of FIG. 11). The second tire may be configured to reduce or eliminate a tire track of the first tire, e.g., using a second tread pattern that opposes to the first tread pattern. In an example, the second tread pattern is exact inverse to the first tread pattern. In another example, the first tire includes a first contact patch on an inner boundary of a tire breadth of the first tire, so that the first tire track includes an inner track remnant. In that example, the second tire includes a second contact patch concentrated on an outer perimeter of a tire breadth of the second tire, and the second tire is configured to eliminate the first tire track by collapsing an outer tread remnant of a second tire track of the second tire onto the inner track remnant of the first tire track.

Method 1000 may proceed to block 1006, where a vehicle is provided, the vehicle has the first tire on a front wheel and the second tire on a back wheel. Method 1000 may proceed to block 1008, where the controller controls the vehicle to traverse an area (e.g., based on an operational profile for the area). Method 1000 may proceed to block 1010, where the first tire creates a surface impact (e.g., a first tire track 1106 of FIG. 11) to a surface of the area.

Method 1000 may proceed to block 1012, where the controller controls the vehicle, e.g., using a surface impact cancellation system, to reduce or eliminate the first tire track by following the first tire with the second tire. In an example, the first tire track of the fire tire mounted on the front wheel is countered (completely or partially) by the second tire track of the second tire mounted on the back wheel (e.g., because of the opposing tread patterns of the first tire and the second tire). In other words, the first tire track is countered/cancelled, partially or completely, using the second tire following the first tire. Referring to FIG. 11, an example residual tire track 1108 is illustrated, which is generated after the first tire track (e.g., tire track 1106) is countered/cancelled partially by the second tire. In an example, the controller is configured to rotationally synchronize the second wheel with the first wheel based on the first tread pattern and the second tread pattern, so that the first tire track is countered by the corresponding opposing portion of the second tire track. In another example, the controller is configured to adjust the tire pressure of the first tire and/or the second tire, such that the depths of the second tire track matches corresponding depths of the first tire track for minimizing the first tire track. In some embodiments, a difference between tire pressure adjustments for the first and second tires is based on a difference between the first tread pattern and the second tread pattern.

Method 1000 may proceed to block 1014, where the controller collects the residual environmental impact data for the residual tire track. At block 1016, the controller analyzes the residual environmental impact data (e.g., for the effectiveness of the surface impact cancellation process at block 1012), and may perform a second surface impact cancellation process (e.g., using an updated operational profile with updated operational parameters). Referring to FIG. 11, an example residual tire track 1110 after the second surface impact cancellation process is illustrated.

Figure 12:
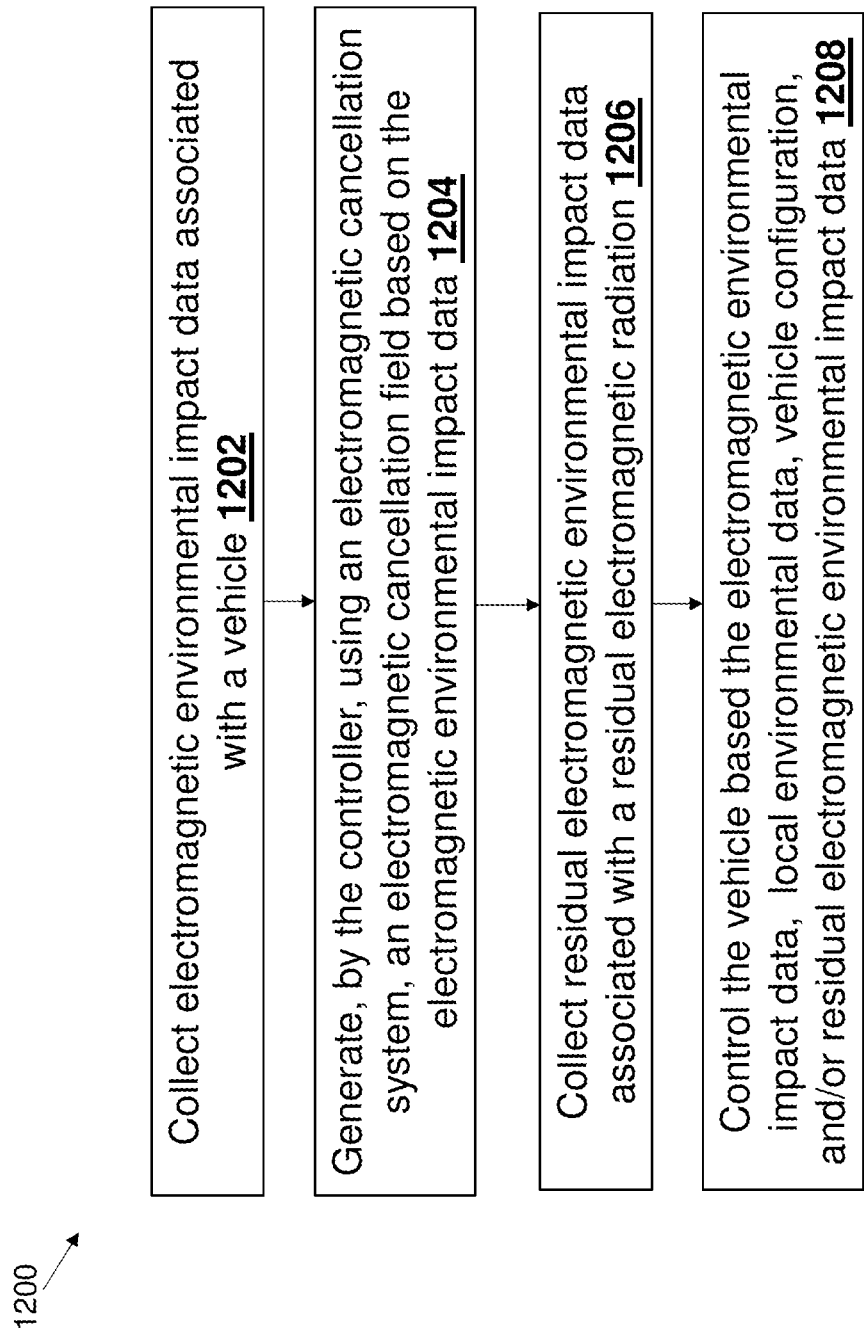
FIG. 12 is a flowchart of an example method for providing and controlling an electrical vehicle to minimize environmental impacts using electromagnetic impact cancellation according to some embodiments.
Figure 13:
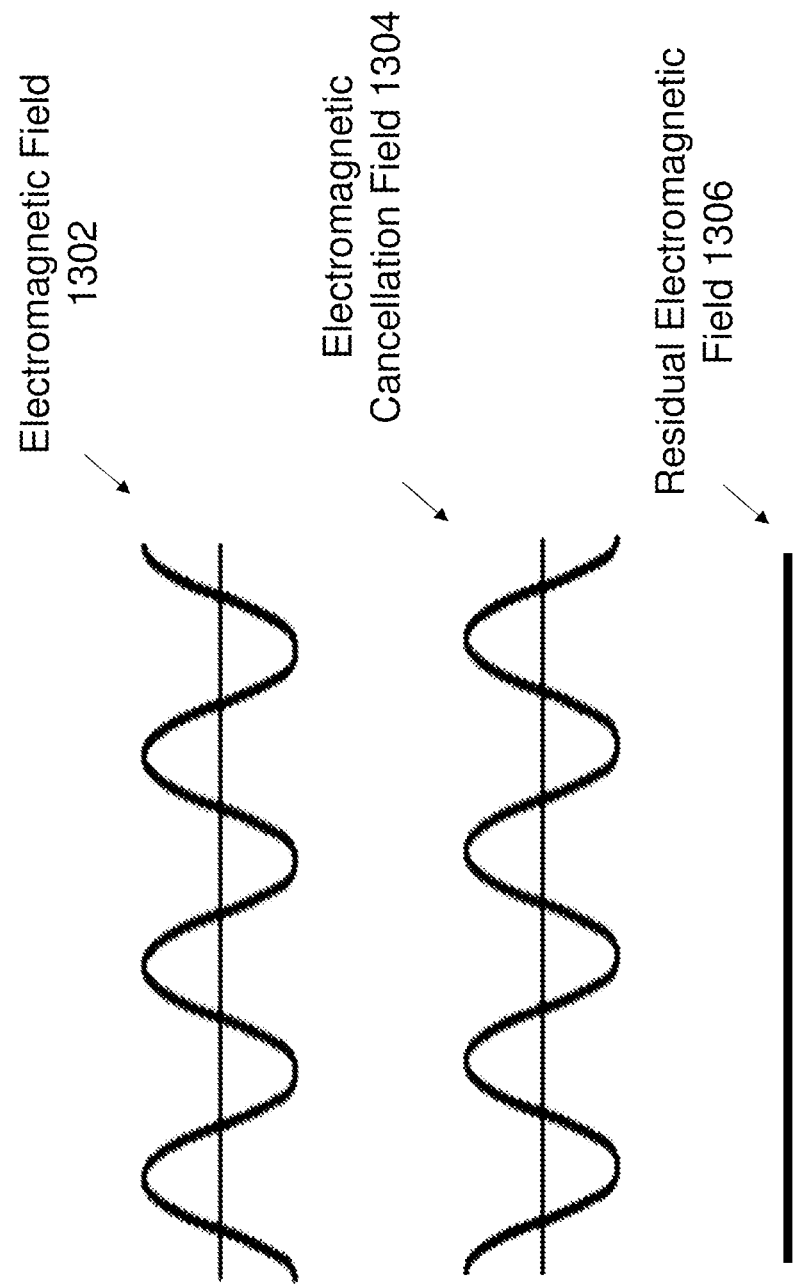
FIG. 13 illustrates example electromagnetic fields for electromagnetic impact cancellation according to some embodiments.

Referring to FIG. 12 and FIG. 13, an example method 1200 for providing and controlling an electrical vehicle to minimize environmental impacts using electromagnetic impact cancellation is described. As shown in FIG. 12, method 1200 may begin at block 1202, where a controller collects electromagnetic environmental impact data associated with an electromagnetic field created by a vehicle. Referring to FIG. 13, an example electromagnetic field 1302 created by a vehicle is illustrated. Method 1200 may proceed to block 1204, where the controller generates, using an electromagnetic impact cancellation system, an electromagnetic cancellation field (e.g., electromagnetic cancellation field 1304 of FIG. 13) based on the electromagnetic environmental impact data to cancel (partially or completely) the electromagnetic field (e.g., electromagnetic field 1302 of FIG. 13) created by a vehicle. In various examples, to cancel electromagnetic field 1302, electromagnetic cancellation field 1304 may have the same or similar frequency and amplitude as the electromagnetic field 1302 but the opposite phase (e.g., with a 180-degree phase shift). In FIG. 13, a residual electromagnetic field 1306 indicating a complete cancellation is illustrated.

Method 1200 may proceed to block 1206, where the controller collects the residual environmental impact data for the residual electromagnetic environmental impact. At block 1208, the controller analyzes the residual environmental impact data (e.g., for the effectiveness of the electromagnetic impact cancellation process at block 1204), and may perform a second electromagnetic impact cancellation process (e.g., using an updated operational profile with updated operational parameters).

Referring to FIG. 14 and FIG. 15, an example method 1400 for providing and controlling an electrical vehicle to minimize environmental impacts using noise impact cancellation is described. As shown in FIG. 14, method 1400 may begin at block 1402, where a controller collects noise environmental impact data associated with noise created by a vehicle. Referring to FIG. 15, an example noise 1502 created by a vehicle is illustrated. Method 1400 may proceed to block 1404, where the controller generates, using a noise impact cancellation system, a noise cancellation sound (e.g., noise cancellation sound 1504 of FIG. 15) based on the noise environmental impact data to cancel (partially or completely) the noise (e.g., noise 1502 of FIG. 15) created by a vehicle. In various examples, to cancel noise 1502, noise cancellation sound 1504 may have the same or similar frequency and amplitude as the noise 1502 but the opposite phase (e.g., with a 180-degree phase shift). In FIG. 15, a residual noise 1506 indicating a complete cancellation is illustrated.

Method 1400 may proceed to block 1406, where the controller collects the residual environmental impact data for the residual noise environmental impact. At block 1408, the controller analyzes the residual environmental impact data (e.g., for the effectiveness of the noise impact cancellation process at block 1404), and may perform a second noise impact cancellation process (e.g., using an updated operational profile with updated operational parameters).

Referring to FIG. 16, an example method 1600 for providing and controlling an electrical vehicle to minimize combined environmental impacts using multiple environmental impact cancellation systems for different types of environmental impacts is described. Method 1600 may begin at block 1602, where a controller collects first environmental impact data associated with a first component environmental impact created by a vehicle. At block 1604, the controller collects second environmental impact data associated with a second component environmental impact created by the vehicle, the first and second component environmental impacts are of different types (e.g., types of surface impacts, electromagnetic impacts, noise impacts, thermal impacts, visual impacts, etc.).

Method 1600 may proceed to block 1606, where priorities of the different types of environmental impacts are determined. In an example, weights are assigned to the different types of environmental impacts to indicate their corresponding priorities, e.g., a weight of 10 for surface impacts indicating a higher priority for reducing surface impacts over electromagnetic impacts, which has a weight of 1.

Method 1600 may proceed to block 1608, where a controller controls the vehicle and the corresponding environmental impact cancellation systems to reduce the combined environmental impacts. An operational profile, with its operation parameters, may be determined based on the priorities of the different types of environmental impacts. The controller may perform an optimization process to determine the operational profile that minimizes the combined environmental impacts (e.g., where different types of environmental impacts may have an equal weight or have different weights based on their priorities).

Method 1600 may proceed to block 1610, where the controller collects residual environmental impact data associated with residual combined environmental impacts. Method 1600 may proceed to block 1612, where the controller may analyze the residual environmental impact data (e.g., for the effectiveness of the impact cancellation process at block 1608), and may perform a second impact cancellation process (e.g., using an updated operational profile with updated operational parameters).

While the LSV could observe possible aberrant behavior and restrict such actions, the LSV system in general can collect use observations, aberrant or not, for future use. One use includes auditing the data, possibly for insurance purposes, to ensure the vehicles are properly used by or on behalf of a stakeholder (e.g., owner, lease holder, etc.). Another use can include compiling one or more machine learning training datasets. The training datasets can then be used to train machine learning models (e.g., artificial neural networks (ANNs), support-vector machines (SVM), random forests, Neuro-Evolution of Augmenting Topologies (NEAT), etc.) to identify acceptable or unacceptable behaviors. Additionally, such datasets can be leveraged to create automated routines or tasks that automated LSVs could take on in the future (e.g., lawn mowing, maintenance, delivery, etc.). In various embodiments, the disclosed techniques give rise to the ability to create automated or autonomous LSVs (e.g., drones, lawn mowers, snowplows, manned or unmanned vehicles, robots, etc.) that use the learned automate or routine tasks.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vehicle. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The specification, examples and data provide a complete description of the structure and use of exemplary embodiments of the vehicle as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

It should be apparent to those skilled in the art that many more modifications besides those already described are possible without departing from the inventive concepts herein. The inventive subject matter, therefore, is not to be restricted except in the spirit of the appended claims. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

What is claimed is:

1. A vehicle for traversing an area with a minimal environmental impact, comprising:
   a first tire mounted on a first wheel, wherein the first tire creates a first tire track in an area when the vehicle is traversing in the area;
   a second tire mounted on a second wheel, wherein the second tire having a second tread pattern based on a first tread pattern of the first tire; and
   a controller configured to:
   control the first wheel and the second wheel such that the first tire track is countered by a second tire track of the second tire;
   determine a residual tire track after the first tire track is countered by the second tire track of the second tire; and
   adjust the vehicle based on the residual tire track.

2. The vehicle of claim 1, wherein the second tread pattern is exact inverse to the first tread pattern.

3. The vehicle of claim 1,
   wherein the first tire includes a first contact patch on an inner boundary of a tire breadth of the first tire;
   wherein the first tire track includes an inner track remnant;
   wherein the second tire includes a second contact patch concentrated on an outer perimeter of a tire breadth of the second tire; and
   wherein the second tire is configured to eliminate the first tire track by collapsing an outer tread remnant of the second tire track of the second tire onto the inner track remnant of the first tire track.

4. The vehicle of claim 1, wherein the controller is configured to:
   rotationally synchronize the second wheel with the first wheel based on the first tread pattern and the second tread pattern.

5. The vehicle of claim 1, wherein the controller is further configured to:
   adjust a tire pressure of at least one of the first tire and the second tire to reduce the first tire track.

6. The vehicle of claim 1, wherein the controller is further configured to:
   perform a first tire pressure adjustment to the first tire; and
   perform a second tire pressure adjustment to the second tire; and
   wherein a difference between the first tire pressure adjustment and the second tire pressure adjustment is based on a difference between the first tread pattern and the second tread pattern.

7. A method for traversing an area with a minimal environmental impact, comprising:

providing a vehicle having a first wheel and a second wheel, wherein a first tire is mounted on the first wheel and a second tire is mounted on the second wheel;

creating, by the first tire, a first tire track in an area when the vehicle is traversing in the area;

controlling the first wheel and the second wheel such that the first tire track is countered by a second tire track of the second tire;

determining a residual tire track after the first tire track is countered by the second tire track of the second tire; and adjusting the vehicle based on the residual tire track.

8. The method of claim 7, further comprising:

eliminating the first tire track by collapsing an outer tread remnant of a second tire track of the second tire onto an inner track remnant of the first tire track.

9. The method of claim 7, wherein the second tire having a second tread pattern based on a first tread pattern of the first tire; and wherein the first tire track is countered by a second tire track of the second tire.

10. The method of claim 9, wherein the second tread pattern is exact inverse to the first tread pattern.

11. The method of claim 9, further comprising:

rotationally synchronizing the second wheel with the first wheel based on the first tread pattern and the second tread pattern.

12. The method of claim 9, further comprising:

performing a first tire pressure adjustment to the first tire; and performing a second tire pressure adjustment to the second tire; and wherein a difference between the first tire pressure adjustment and the second tire pressure adjustment is based on a difference between the first tread pattern and the second tread pattern.

13. The method of claim 7, further comprising:

adjusting a tire pressure of at least one of the first and second tires to reduce the first tire track.

14. The method of claim 7, further comprising:

adjusting a tire pressure of at least one of the first and second tires based on the residual tire track.

15. The method of claim 7, further comprising:

receiving, from a plurality of sensors, environmental data; and controlling one or more components of the vehicle based on the environmental data to reduce a first environmental impact.

16. The method of claim 15, wherein the first environmental impact includes one of an electromagnetic impact, a noise impact, a thermal impact, and a visual impact.

17. The method of claim 16, further comprising:

controlling a noise impact cancellation system to generate noise impact cancellation sounds to cancel the noise impact.

18. The method of claim 16, further comprising:

controlling an electromagnetic impact cancellation system including one or more electronic components for generating an electromagnetic cancellation field to cancel the electromagnetic impact.

19. The method of claim 16, further comprising:

controlling a thermal impact cancellation system for cancelling the thermal impact.

20. The vehicle of claim 1, wherein the controller is further configured to:

adjust a tire pressure of at least one of the first and second tires based on the residual tire track.

* * * * *